US012654780B2

(12) United States Patent
Castillo et al.

(10) Patent No.: US 12,654,780 B2
(45) Date of Patent: Jun. 16, 2026

(54) STRUCTURAL PANEL ASSEMBLY AND METHOD OF MANUFACTURING

(71) Applicant: GM GLOBAL TECHNOLOGY OPERATIONS LLC, Detroit, MI (US)

(72) Inventors: Brian V. Castillo, Birmingham, MI (US); Eugene J. Cascio, Jr., Clinton Township, MI (US); Joshua Lee Solomon, Berkley, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 378 days.

(21) Appl. No.: 18/450,704

(22) Filed: Aug. 16, 2023

(65) Prior Publication Data

US 2025/0058834 A1 Feb. 20, 2025

(51) Int. Cl.
B62D 25/20 (2006.01)
B21B 1/22 (2006.01)
B60K 1/04 (2019.01)
B62D 27/02 (2006.01)

(52) U.S. Cl.
CPC ............... B62D 25/20 (2013.01); B21B 1/22 (2013.01); B62D 27/023 (2013.01); B60K 1/04 (2013.01); B60K 2001/0438 (2013.01)

(58) Field of Classification Search
CPC .... B21B 1/22; B60K 1/04; B60K 2001/0438; B62D 25/20; B62D 27/023
See application file for complete search history.

(56) References Cited

U.S. PATENT DOCUMENTS

2015/0165724 A1* 6/2015 Cox .......................... B32B 7/12
156/196

FOREIGN PATENT DOCUMENTS

KR 102356464 B1 * 2/2022 ........... B62D 21/157

OTHER PUBLICATIONS

DE 102018110481 B3 (Year: 2019).*

* cited by examiner

*Primary Examiner* — Lori Lyjak
(74) *Attorney, Agent, or Firm* — Ingrassia Fisher & Lorenz, LLP | IF&L

(57) ABSTRACT
A vehicle includes a frame that defines an opening, and a structural panel assembly coupled to the opening. The structural panel assembly includes a first material, a second material opposite the first material, and a third material positioned between the first material and the second material. The third material has an undulating shape that includes a peak and a valley, and the first material is coupled to the peak and the second material is coupled to the valley.

20 Claims, 15 Drawing Sheets

STRUCTURAL PANEL ASSEMBLY AND METHOD OF MANUFACTURING

INTRODUCTION

The technical field generally relates to a structural panel assembly and a method for manufacturing the structural panel assembly, and more particularly relates to a vehicle including a structural panel assembly, and the method of manufacturing the structural panel assembly.

Generally, vehicles include a body coupled to a frame, which encloses components of the vehicle. In the example of battery-powered vehicles, such as hybrid and electric vehicles, one or more portions of the body may be used to enclose and/or support one or more batteries associated with the vehicle. For example, a floor panel may be used to support occupants and to enclose one or more batteries associated with the vehicle. In these instances, additional supports may be necessary to reinforce the floor panel.

Accordingly, it is desirable to provide a structural panel assembly and method for manufacturing the structural panel assembly, which reduces the need for additional supports. Furthermore, other desirable features and characteristics of the present disclosure will become apparent from the subsequent detailed description and the appended claims, taken in conjunction with the accompanying drawings and the foregoing technical field and background.

SUMMARY

According to various embodiments, provided is a method for manufacturing a structural panel assembly. The method includes providing at least a first material, a second material and a third material positioned between the first material and the second material. The method includes forming the third material to have an undulating shape, and observing, by a sensor, the undulating shape of the third material. The method includes controlling, by a processor, a movement of a welder relative to the first material or the second material based on the observing to weld the first material and the second material to the third material.

The providing the first material, the second material and the third material further includes providing a first coil of the first material, a second coil of the second material and a third coil of the third material. The forming the third material to have the undulating shape further includes forming a plurality of peaks and a plurality of valleys in the third material using a forming roller. The first material and the second material extend along a longitudinal axis, and the forming the third material to have the undulating shape further includes forming the third material to have at least one peak that extends along an axis transverse to the longitudinal axis. The first material and the second material extend along a longitudinal axis, and the forming the third material to have the undulating shape further includes forming the third material to have at least one peak that extends along an axis parallel to the longitudinal axis. The method includes piercing the third material with at least one piercing roller prior to the forming. The first material, the second material and the third material extend along a longitudinal axis and the controlling, by the processor, the movement of the welder further includes: determining, by the processor, a speed for the welder; determining, based on the observing, a position of the undulating shape relative to an axis transverse to the longitudinal axis; determining, by the processor, a position of the welder relative to the axis based on position data associated with the welder; calculating, by the processor, an error value based on a difference between the position of the undulating shape and the position of the welder; adjusting, by the processor, the speed of the welder based on the error value; and outputting, by the processor, one or more control signals to an actuator to move the welder at the speed. The determining the speed of the welder further includes: calculating, by the processor, a pitch angle for a weld path of the welder; and calculating, by the processor, the speed based on the pitch angle and a speed associated with a feed of the first material, the second material and the third material. The calculating the pitch angle is based on a spacing of the undulating shape, a width of the first material, and a quantity of the welder. The adjusting the speed of the welder further includes: applying, by the processor, a proportional, integral and derivative algorithm to determine a correction term for the speed of the welder; adding, by the processor, the correction term to the speed of the welder to obtain a new speed; and outputting, by the processor, one or more control signals to the actuator to move the welder at the new speed. The welding the first material and the second material to the third material further comprises: forming, with the welder, a plurality of intermittent welds between the first material and the third material; and forming, with the welder, a second plurality of intermittent welds between the second material and the third material.

Also provided according to various embodiments is a method for manufacturing a structural panel assembly. The method includes providing at least a first coil of a first material, a second coil of a second material and a third coil of a third material, the third material fed by the third coil such that the third material is positioned between the first material and the second material and forming the third material to have an undulating shape including a peak and a valley. The method includes observing, by a sensor, at least one of the peak and the valley of the third material, and controlling, by a processor, a movement of a first welder relative to the first material based on the observing of the peak to weld the first material to the peak of the third material. The method includes controlling, by the processor, a movement of a second welder relative to the first material based on the observing of the valley to weld the second material to the valley of the third material.

The forming the third material to have the undulating shape further includes: forming a plurality of peaks and a plurality of valleys in the third material using a pair of forming rollers. The first material and the second material extend along a longitudinal axis, and the forming the third material to have the undulating shape further includes forming the third material to have the peak and the valley that each extend along an axis transverse to the longitudinal axis. The first material and the second material extend along a longitudinal axis, and the forming the third material to have the undulating shape further includes forming the third material to have the peak and the valley each extend along an axis parallel to the longitudinal axis. The method includes piercing the third material with a pair of piercing rollers prior to the forming. The first material, the second material and the third material extend along a longitudinal axis and the controlling, by the processor, the movement of the first welder further includes: determining, by the processor, a speed for the first welder; determining, based on the observing, a position of the peak relative to an axis transverse to the longitudinal axis; determining, by the processor, a position of the first welder relative to the axis based on position data associated with the first welder; calculating, by the processor, an error value based on a difference between a position of the peak and the position of the first welder; adjusting, by the processor, the speed of the first welder based on the error value; and outputting, by the processor, one or more control signals to an actuator to move the first welder at the speed to weld the first material to the peak of the third material. The determining the speed of the first welder further includes: calculating, by the processor, a pitch angle for a weld path of the first welder; and calculating, by the processor, the speed based on the pitch angle and at least a speed associated with a feed of the third material. The undulating shape comprises a plurality of the peaks, and calculating the pitch angle is based on a spacing between adjacent ones of the peaks, a width of the first material, and a quantity of the first welder. The adjusting the speed of the first welder further includes: applying, by the processor, a proportional, integral and derivative algorithm to determine a correction term for the speed of the first welder; adding, by the processor, the correction term to the speed of the first welder to obtain a new speed; and outputting, by the processor, one or more control signals to the actuator to move the first welder at the new speed.

According to various embodiments, also provided is a vehicle. The vehicle includes a frame that defines an opening, and a structural panel assembly is coupled to the opening. The structural panel assembly includes a first material, a second material opposite the first material, and a third material positioned between the first material and the second material. The third material has an undulating shape that includes a peak and a valley, and the first material is coupled to the peak and the second material is coupled to the valley.

The first material, the second material and the third material are composed of a metal or a metal alloy. The first material is welded to the peak and the second material is welded to the valley. The first material is welded to the peak via a plurality of intermittent welds, and the second material is welded to the valley via a second plurality of intermittent welds. The structural panel assembly has a longitudinal axis and the peak and the valley each extend along an axis parallel to the longitudinal axis. The structural panel assembly has a longitudinal axis and the peak and the valley each extend along an axis perpendicular to the longitudinal axis. The third material includes a plurality of openings. The plurality of openings is defined along a wall that interconnects the peak with the valley. The opening separates an occupant cabin from a stowage compartment for one or more batteries associated with the vehicle.

Also provided according to various embodiments is a vehicle. The vehicle includes a frame that defines an opening that separates an occupant cabin from a stowage compartment. The vehicle includes a structural panel assembly coupled to the opening to enclose the opening. The structural panel assembly includes a first material, a second material opposite the first material, and a third material positioned between the first material and the second material. The third material has an undulating shape that includes a peak and a valley. The first material, the second material and the third material are composed of a metal or metal alloy, and the first material is welded to the peak and the second material is welded to the valley.

The first material is welded to the peak via a plurality of intermittent welds, and the second material is welded to the valley via a second plurality of intermittent welds. The structural panel assembly has a longitudinal axis and the peak and the valley each extend along an axis parallel to the longitudinal axis. The structural panel assembly has a longitudinal axis and the peak and the valley each extend along an axis perpendicular to the longitudinal axis. The third material includes a plurality of openings. The plurality of openings is defined along a wall that interconnects the peak with the valley.

Also provided according to various embodiments is a system for manufacturing a structural panel assembly for a vehicle. The system includes a first material, a second material, a third material positioned between the first material and the second material. The system includes a pair of forming rollers configured to receive the third material to impart the third material with an undulating shape that includes a peak and a valley, and a sensor that observes at least one of the peak and the valley. The system includes a controller, having a processor, configured to: output one or more control signals to control a movement of a welder relative to the first material based on the observation of the peak to weld the first material to the third material at the peak.

The structural panel assembly extends along a longitudinal axis, and the peak and the valley each extend along an axis transverse to the longitudinal axis. The structural panel assembly extends along a longitudinal axis, and the peak and the valley each extend along an axis parallel to the longitudinal axis. The system includes at least one piercing roller configured to form a plurality of openings within the third material. The controller is further configured to determine a speed for the welder, to determine a position of the peak based on the observation of the peak, to determine a position of the welder based on position data associated with the welder, to calculate an error value based on a difference between the position of the peak and the position of the welder and to adjust the speed of the welder based on the error value.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
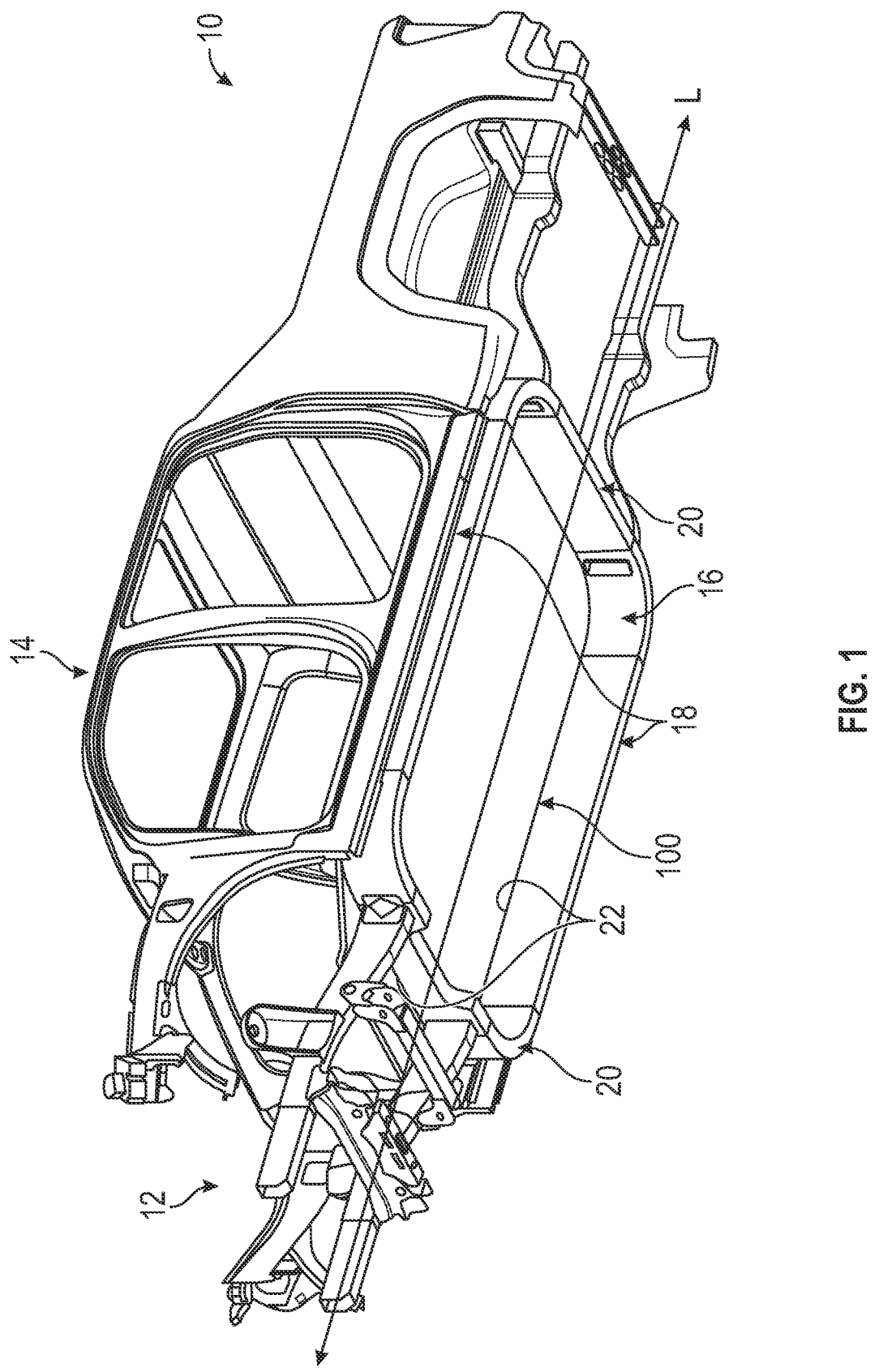
FIG. 1 is a bottom perspective view of a vehicle including an exemplary structural panel assembly, in accordance with various embodiments.

The following detailed description is merely exemplary in nature and is not intended to limit the application and uses. Furthermore, there is no intention to be bound by any expressed or implied theory presented in the preceding introduction, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, machine learning models, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "about" denotes within 10% to account for manufacturing tolerances. In addition, the term "substantially" denotes within 10% to account for manufacturing tolerances.

Figure 1A:
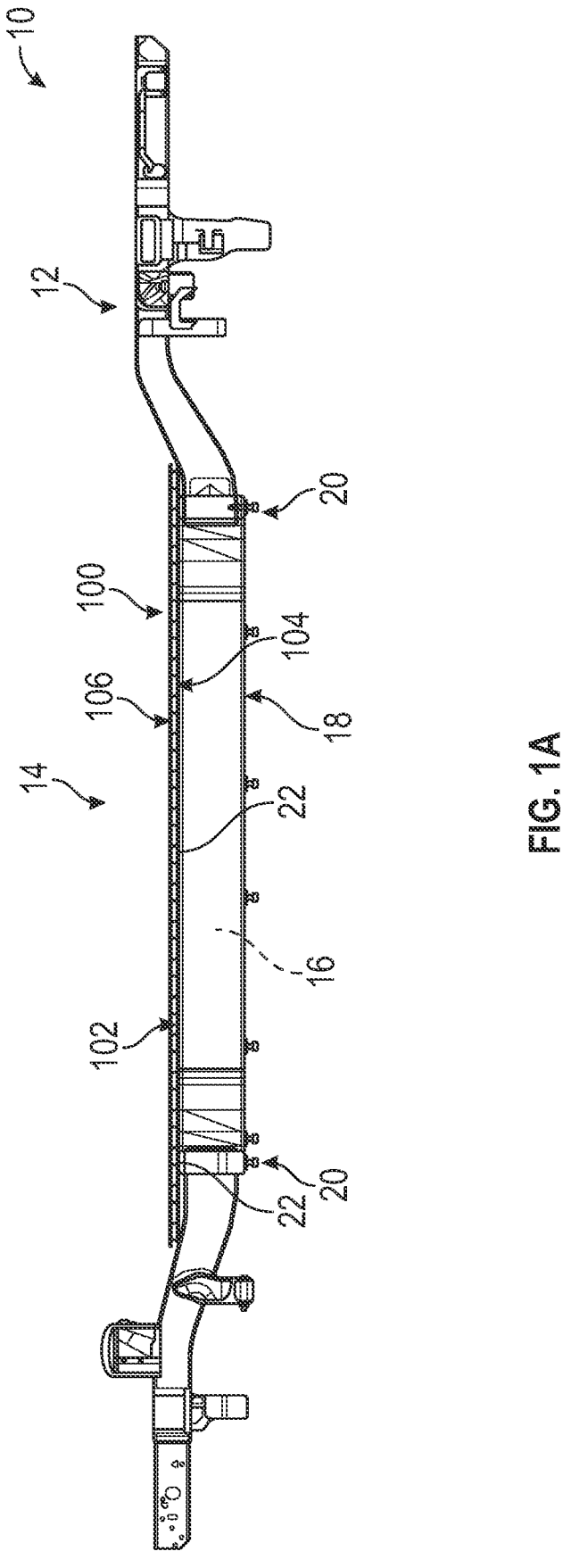
FIG. 1A is a simplified side view of the vehicle of FIG. 1, which includes the structural panel assembly coupled to a frame of the vehicle, in accordance with various embodiments.
Figure 1B:
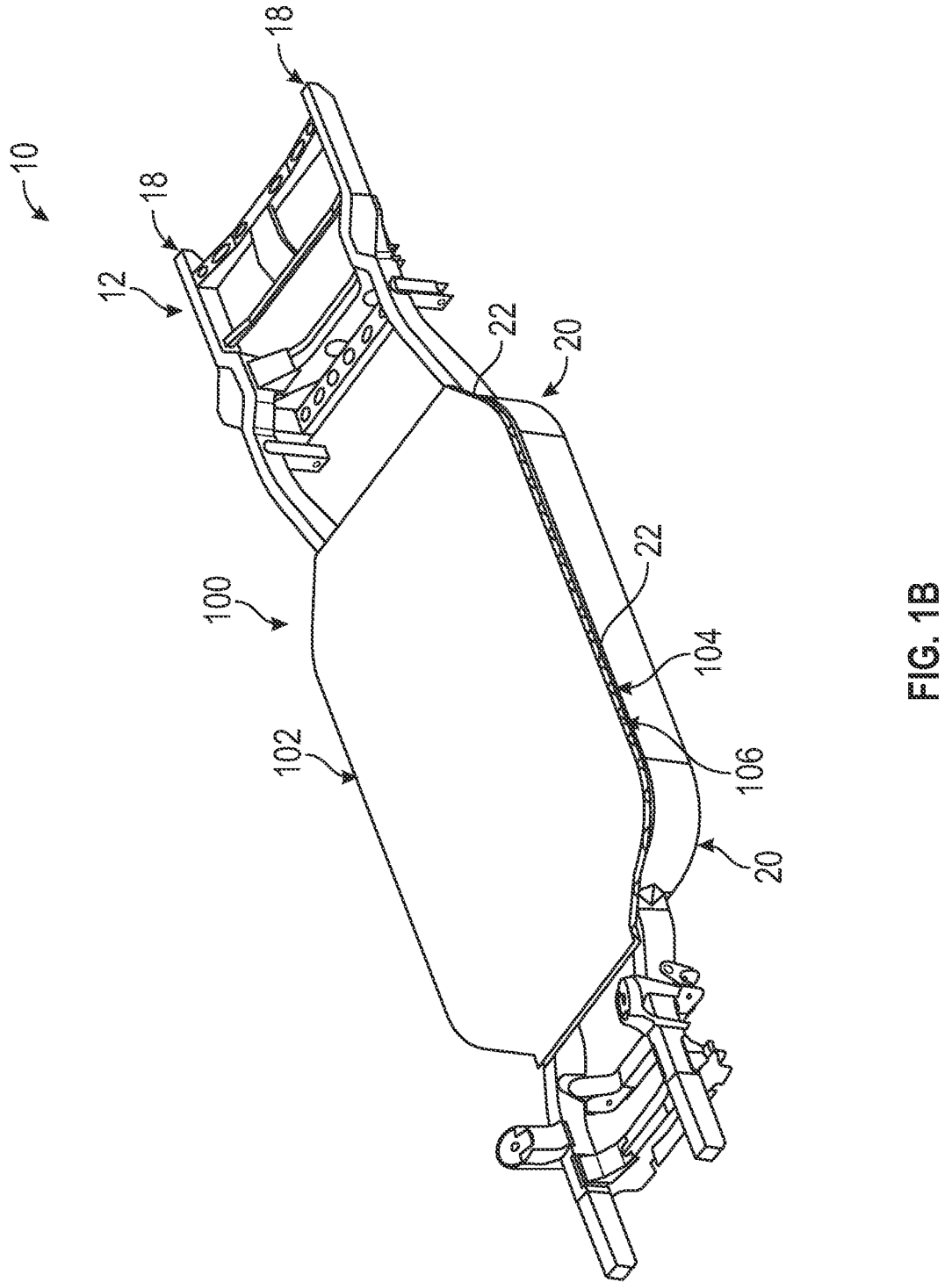
FIG. 1B is a simplified top perspective view of the vehicle of FIG. 1, which includes the structural panel assembly coupled to the frame of the vehicle, in accordance with various embodiments.

With reference to FIG. 1, a structural panel assembly 100 is shown associated with a frame 12 of a vehicle 10. The vehicle 10 is described below as a hybrid or electric vehicle containing one or more batteries, however, it should be understood that the structural panel assembly 100 may be used with other vehicles and in other non-vehicular applications. In addition, while the vehicle 10 may comprise a passenger car, it should be appreciated that any other vehicle, including motorcycles, trucks, sport utility vehicles (SUVs), recreational vehicles (RVs), marine vessels, aircraft may include one or more of the structural panel assemblies 100. In one example, with additional reference to FIGS. 1A and 1B, the structural panel assembly 100 is a floor panel, which separates an occupant cabin generally indicated as 14 from a battery storage compartment generally indicated as 16. In this example, the frame 12 includes a pair of opposed longitudinal rails 18 that extend along an axis substantially parallel to a longitudinal axis L of the vehicle 10, and a pair of cross bars 20, which are coupled to each of the longitudinal rails 18 to define a substantially rectangular floor region. The structural panel assembly 100 is coupled to a first surface 22 of each of the longitudinal rails 18 and the cross bars 20 to define the floor panel of the occupant cabin 14 of the vehicle 10, and to enclose an end of the battery storage compartment 16. In one example, the structural panel assembly 100 is welded to the first surface 22 of each of the longitudinal rails 18 and the cross bars 20. The structural panel assembly 100 provides support for the occupants of the occupant cabin 14, while also providing impact resistance to protect one or more batteries contained within the battery storage compartment 16.

Figure 2:
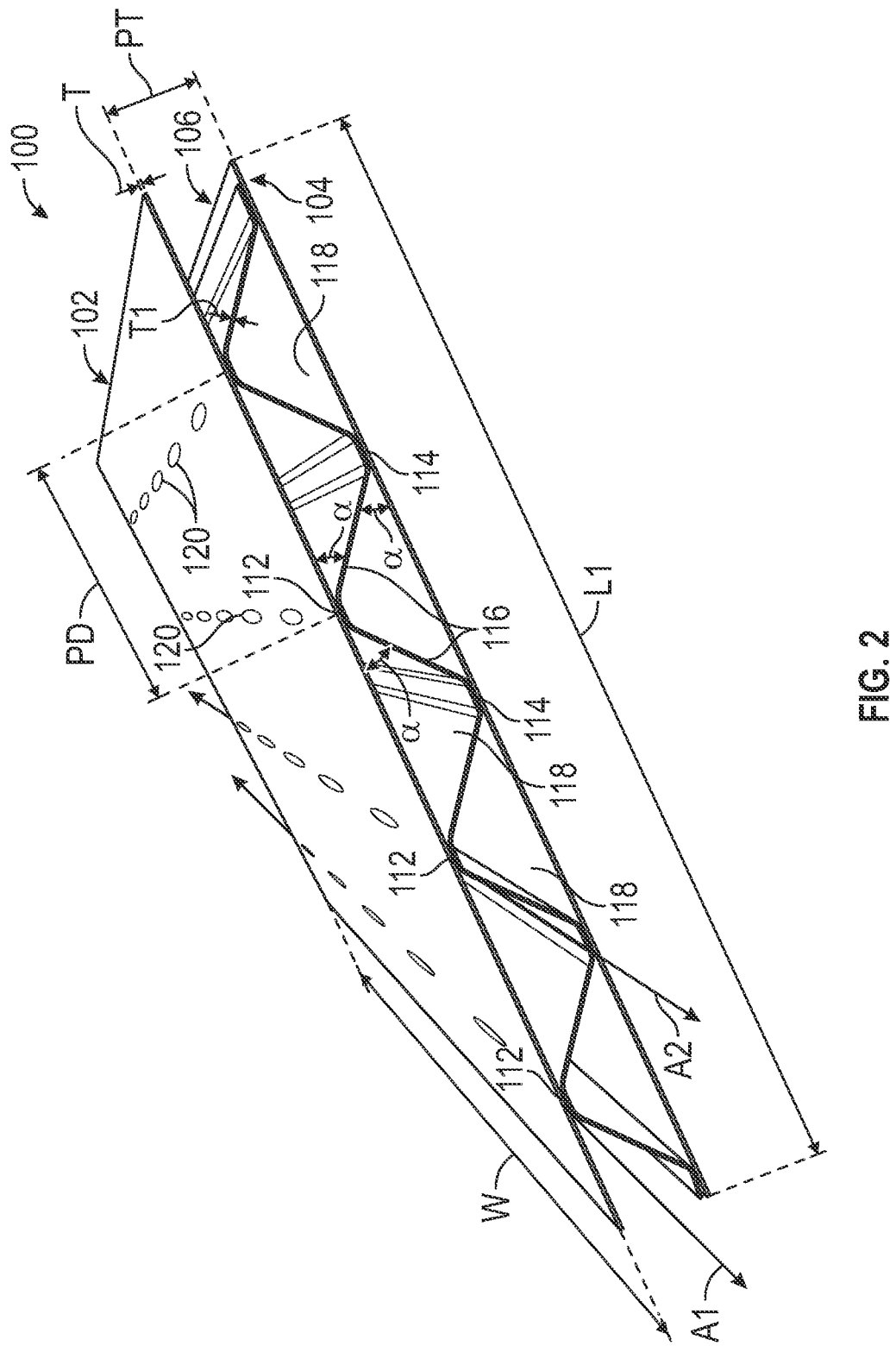
FIG. 2 is an end view of the structural panel assembly of FIG. 1.
Figure 6:
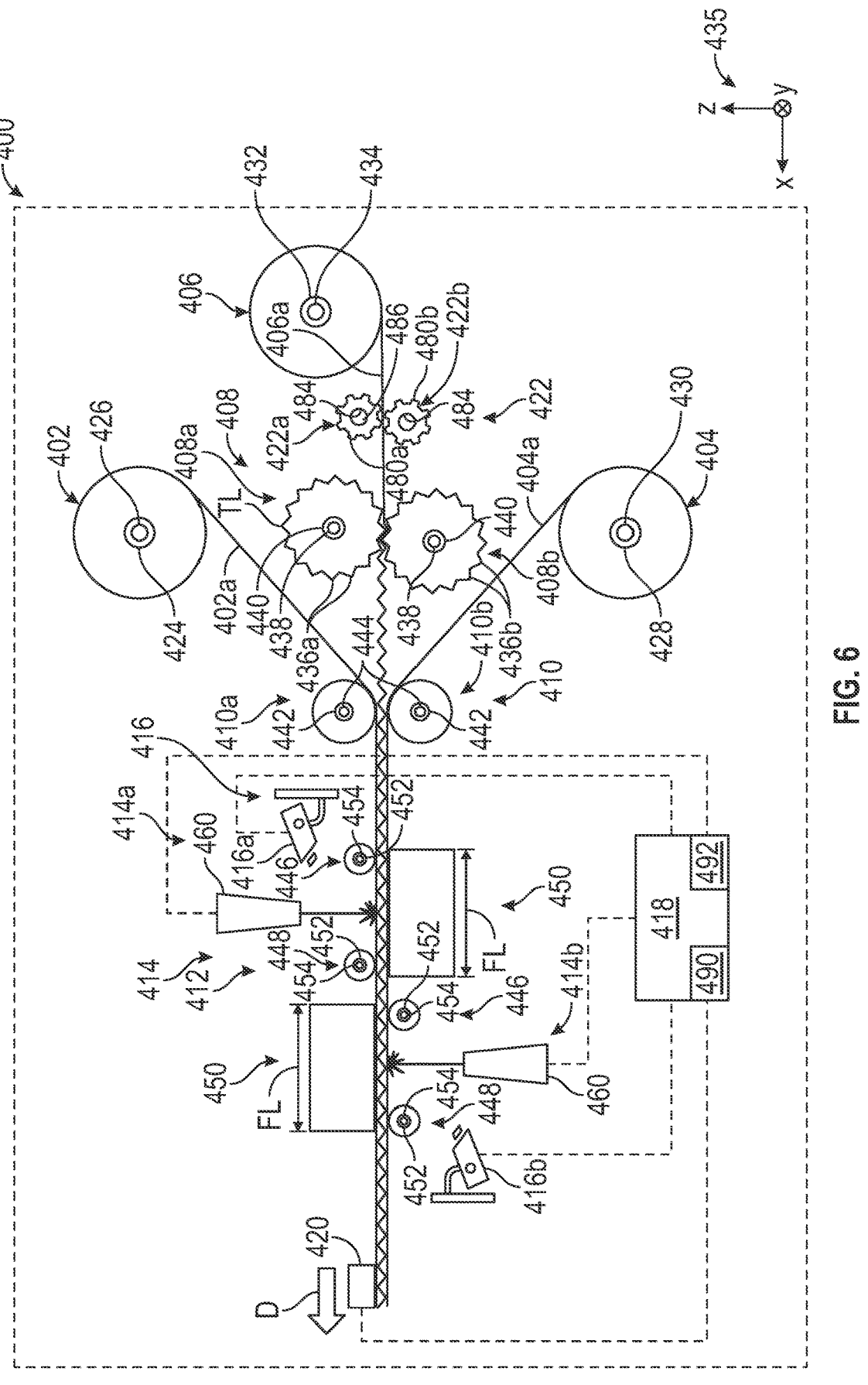
FIG. 6 is a schematic illustration of a manufacturing system for forming the structural panel assembly of FIGS. 1-5.

With reference to FIG. 2, the structural panel assembly 100 is shown in greater detail. In one example, the structural panel assembly 100 includes a first, top panel 102, a second, bottom panel 104 and a third, intermediate panel 106. In this example, each of the top panel 102, the bottom panel 104 and the intermediate panel 106 are composed of a metal or metal alloy material or material 402a, 404a, 406a, respectively, including, but not limited to aluminum, aluminum alloy, steel, etc. The top panel 102 and the bottom panel 104 have substantially the same thickness T. The thickness T is about 0.7 millimeters (mm) to about 1.1 millimeters (mm), and in one example, is about 0.9 millimeters (mm). The intermediate panel 106 may have a thickness T1, which is different and less than the thickness T to provide a weight savings, for example. The thickness T1 is about 0.3 millimeters (mm) to about 0.7 millimeters (mm), and in one example, is about 0.5 millimeters (mm). In other examples, the thickness T, T1 of the top panel 102, the bottom panel 104 and the intermediate panel 106 may be about the same. The thickness T, T1 is substantially uniform over each of the top panel 102, the bottom panel 104 and the intermediate panel 106, respectively. The top panel 102 and the bottom panel 104 are each planar or flat, and each extend along a respective axis A1, A2 in a Y-direction (FIG. 6). The axis A1 is substantially parallel to the axis A2, and in the example of FIG. 1, the axes A1, A2 are substantially perpendicular to the longitudinal axis L. The top panel 102 and the bottom panel 104 also extend along the longitudinal axis L in an X-direction (FIG. 6). Generally, each of the top panel 102 and the bottom panel 104 may be trimmed or cut along an axis parallel to the axes A1, A2 to define the structural panel assembly 100 with a predefined length L1 along the longitudinal axis L or X-direction (FIG. 6), which is about 1.5 meters (m) to about 2.5 meters (m), in the example of the vehicle 10. It should be noted that the structural panel assembly 100 may be cut to different lengths based on the size of the vehicle 10. The structural panel assembly 100 also has a predefined width W, which in this example is about 1.3 meters (m) to about 2.0 meters (m). The structural panel assembly 100 has a predefined panel thickness PT, which in this example is about 20 millimeters (mm) to about 50 millimeters (mm).

In one example, the panel thickness PT is defined by the intermediate panel 106. In this example, the intermediate panel 106 has an undulating shape 110, which is defined over the length L1 of the structural panel assembly 100. In one example, the undulating shape 110 includes a plurality of peaks 112 that alternate with a plurality of valleys 114. The peaks 112 are spaced apart from each other by a peak distance PD, which in one example, is about 40 millimeters (mm) to about 100 millimeters (mm). A plurality of walls 116 interconnect the peaks 112 and the valleys 114. In this example, each of the walls 116 extend at an angle α of about 45 degrees relative to the top panel 102. In addition, each of the walls 116 extend at the angle α of about 45 degrees relative to the bottom panel 104. In this example, each of the walls 116 are solid or devoid of openings. Generally, each of the walls 116 are defined to extend at about a 45 degree angle between the top panel 102 and the bottom panel 104 to define a plurality of closed sections or triangles 118 in cross-section when the intermediate panel 106 is coupled to the top panel 102 and the bottom panel 104. The triangles 118 defined by the undulating shape 110 act as trusses, and distribute loads received radially and/or axially over a surface of the structural panel assembly 100. The formation of the closed sections or triangles 118 also assists in energy absorption, and resist buckling and bending of the structural panel assembly 100. The distribution of loads due to the undulating shape 110 of the intermediate panel 106 protects the batteries contained within the battery storage compartment 16 (FIG. 1), and also enables the structural panel assembly 100 to withstand the weight of the occupants in the occupant cabin 14 (FIG. 1).

In one example, the peaks 112 are coupled to the top panel 102, and the valleys 114 are coupled to the bottom panel 104 such that the triangles 118 are formed to extend along the axes A1, A2. In this example, the peaks 112 and the valleys 114 are each coupled to the respective one of the top panel 102 and the bottom panel 104 via a series of welds to form the closed sections or triangles 118. Generally, the top panel 102 and the bottom panel 104 are each welded to the intermediate panel 106 via stitch welding or a plurality of line welds 120, which are intermittent or spaced apart along the X-direction (FIG. 6). It should be noted that in other examples, the top panel 102 and the bottom panel 104 may each be welded to the intermediate panel 106 via spot welding or a plurality of spot welds, which are intermittent or spaced apart along the X-direction. Further, it should be noted that the stitch welds or line welds 120, while illustrated herein as linear welds, may also be formed with an oscillating pattern, such as a sinusoid pattern, if desired. The line welds 120 are defined so as to extend in the direction of the axis A1, along the top panel 102 at each of the peaks 112 to weld the peaks 112 to the top panel 102. The line welds 120 are defined so as to extend in the direction of the axis A1, along the bottom panel 104 at each of the valleys 114 to weld the valleys 114 to the bottom panel 104. The line welds 120 rigidly and fixedly couple the top panel 102 and the bottom panel 104 to the intermediate panel 106. Generally, the line welds 120 are spaced apart in the direction of the axis A1 such that the line welds 120 are discrete or non-continuous along the respective one of the peaks 112 and the valleys 114. By providing the line welds 120 that are intermittent or spaced apart, an issue with one of the line welds 120 does not necessarily propagate to another one of the line welds 120. Stated another way, the end of each individual "stitch" or line weld 120 serves as a stopping point in the instance of an issue with the line weld 120. In this example, each of the peaks 112 and each of the valleys 114 include at least one or a plurality of the line welds 120. It should be noted that in other embodiments, one or more of the peaks 112 and/or the valleys 114 may be devoid of line welds 120, and moreover, other types of welds may be used to couple the top panel 102 and the bottom panel 104 to the intermediate panel 106.

It should be noted that in other embodiments, the structural panel assembly 100 may be configured differently to provide support and impact resistance. For example, with reference to FIG. 3, a structural panel assembly 200 is shown. As the structural panel assembly 200 includes components that are the same or similar to components of the structural panel assembly 100 discussed with regard to FIGS. 1-2, the same reference numerals will be used to denote the same or similar components. In one example, structural panel assembly 200 is shown in greater detail. The structural panel assembly 200 may be coupled to the first surface 22 of each of the longitudinal rails 18 and the cross bars 20 to define the floor panel of the occupant cabin 14 of the vehicle 10, and to enclose an end of the battery storage compartment 16 (FIG. 1). The structural panel assembly 200 provides support for the occupants of the occupant cabin 14, while also providing impact resistance to protect one or more batteries contained within the battery storage compartment 16.

In one example, the structural panel assembly 200 includes the first, top panel 102, the second, bottom panel 104 and a third, intermediate panel 206. In this example, the intermediate panel 206 is composed of the material 406a. The intermediate panel 206 has the thickness T1, which is substantially uniform over the intermediate panel 206. The top panel 102 and the bottom panel 104 are each planar or flat, and each extend along the respective axis A1, A2. The axis A1 is substantially parallel to the axis A2, and in the example of FIG. 3, the axes A1, A2 are substantially perpendicular to a longitudinal axis L2 of the structural panel assembly 200. Generally, each of the top panel 102, the bottom panel 104 and the intermediate panel 206 may be trimmed or cut along an axis parallel to the axes A1, A2 to define the structural panel assembly 200 with the predefined length L1. The structural panel assembly 200 also has the predefined width W. The structural panel assembly 200 has the predefined panel thickness PT.

In one example, the panel thickness PT is defined by the intermediate panel 206. In this example, the intermediate panel 206 has an undulating shape 210, which is defined over the length L1 of the structural panel assembly 200. In one example, the undulating shape 210 includes a plurality of peaks 212 that alternate with a plurality of valleys 214. The peaks 212 are spaced apart from each other by the peak distance PD. A plurality of walls 216 interconnect the peaks 212 and the valleys 214. In this example, each of the walls 216 extend at an angle α of about 45 degrees relative to the top panel 102. In addition, each of the walls 216 extend at the angle α of about 45 degrees relative to the bottom panel 104. Generally, each of the walls 216 are defined to extend at about a 45 degree angle between the top panel 102 and the bottom panel 104 to define a plurality of closed sections or triangles 218 in cross-section when the intermediate panel 206 is coupled to the top panel 102 and the bottom panel 104. The triangles 218 defined by the undulating shape 210 act as trusses, and distribute loads received radially and/or axially over a surface of the structural panel assembly 200. The formation of the closed sections or triangles 218 also assists in energy absorption, and resist buckling and bending of the structural panel assembly 200. The distribution of loads due to the undulating shape 210 of the intermediate panel 206 protects the batteries contained within the battery storage compartment 16 (FIG. 1), and also enables the structural panel assembly 200 to withstand the weight of the occupants in the occupant cabin 14 (FIG. 1).

Figure 4:
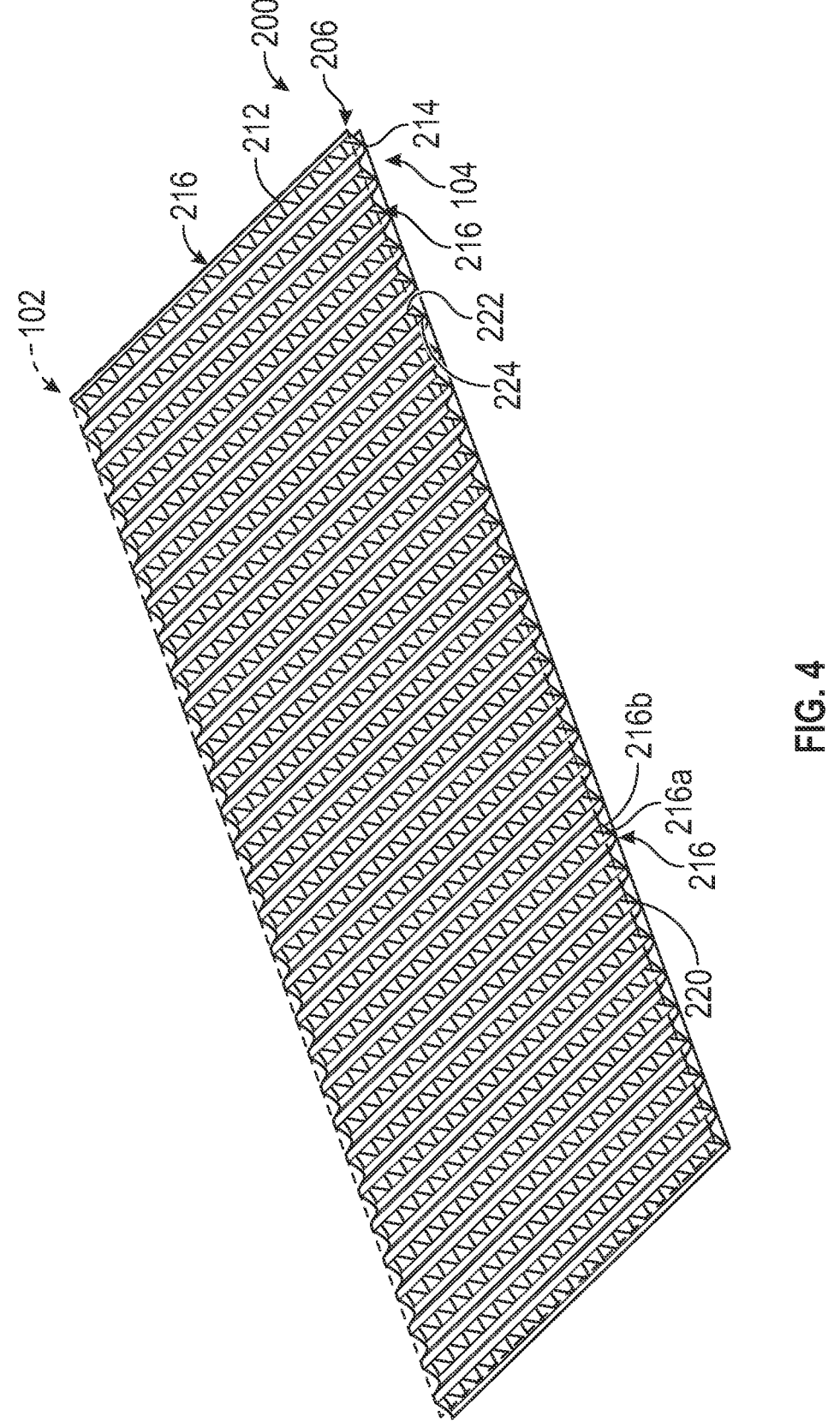
FIG. 4 is a perspective view of the structural panel assembly of FIG. 3, in which a first, top panel is shown in phantom lines to illustrate the underlying structure.
Figure 13:
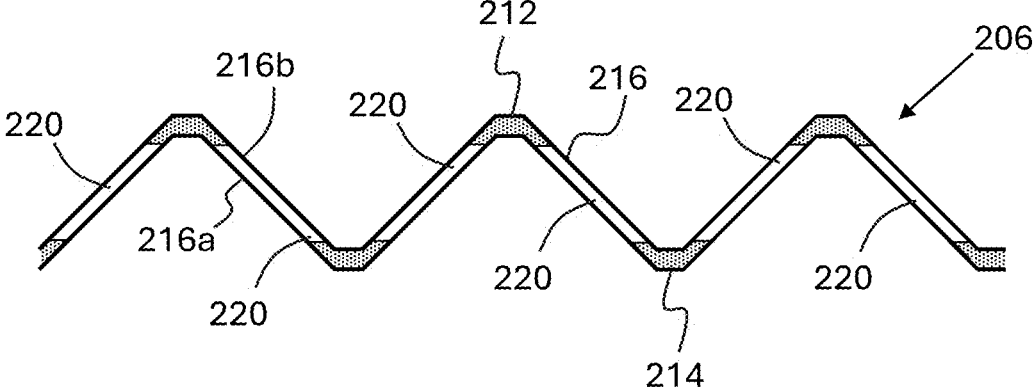
FIG. 13 is a cross-sectional view of a portion of the intermediate panel of the structural panel assembly of FIG. 4, taken along a line passing through aligned openings in the intermediate panel, in accordance with various embodiments.

With reference to FIG. 4 Cross-referencing FIG. 4 and FIG. 13, in one example, each of the walls 216 include at least one or a plurality of openings 220, which are defined to extend through the wall 216 from a first surface 216a of the wall 216 to an opposite, second surface 216b of the wall 216. In this example, the plurality of openings 220 comprise a plurality of alternating isosceles triangles, which are defined to extend along an axis parallel to the axes A1, A2. In other words, the plurality of openings 220 are defined such that an apex 222 of a first one of the openings 220 is adjacent to a base 224 of an adjacent second one of the openings 220. Generally, the openings 220 are defined such that the wall 216 has a plurality of legs 226, which interconnect the respective peak 212 with the respective valley 214. The plurality of legs 226 are defined to extend at an angle of about 45 degrees relative to the respective valley 214. The openings 220 provide a mass savings for the structural panel assembly 200. It should be noted that while the openings 220 are illustrated and described herein as comprising a plurality of alternating isosceles triangles, the openings 220 may have any desired shape and may be formed in any predetermined pattern.

The peaks 212 are coupled to the top panel 102, and the valleys 214 are coupled to the bottom panel 104 such that the triangles 218 are formed to extend along the axes A1, A2. In this example, the peaks 212 and the valleys 214 are each coupled to the respective one of the top panel 102 and the bottom panel 104 via a series of welds. Generally, the top panel 102 and the bottom panel 104 are each welded to the intermediate panel 206 via stitch welding or the plurality of line welds 120, which are intermittent or spaced apart in the Y-direction (FIG. 6). It should be noted that in other examples, the top panel 102 and the bottom panel 104 may each be welded to the intermediate panel 206 via spot welding or a plurality of spot welds, which are intermittent or spaced apart along the X-direction. Further, it should be noted that the stitch welds or line welds 120, while illustrated herein as linear welds, may also be formed with an oscillating pattern, such as a sinusoid pattern, if desired. The line welds 120 are defined so as to extend in the direction of the axis A1, along the top panel 102 at each of the peaks 212 to weld the peaks 212 to the top panel 102. The line welds 120 are defined so as to extend in the direction of the axis A1, along the bottom panel 104 at each of the valleys 214 to weld the valleys 214 to the bottom panel 104. The line welds 120 rigidly and fixedly couple the top panel 102 and the bottom panel 104 to the intermediate panel 206. Generally, the line welds 120 are spaced apart in the direction of the axis A1 such that the line welds 120 are discrete or non-continuous along the respective one of the peaks 212 and the valleys 214. In this example, each of the peaks 212 and each of the valleys 214 include at least one or a plurality of the line welds 120. It should be noted that in other embodiments, one or more of the peaks 212 and/or the valleys 214 may be devoid of line welds 120, and moreover, other types of welds may be used to couple the top panel 102 and the bottom panel 104 to the intermediate panel 206.

It should be noted that in other embodiments, the structural panel assembly 100 may be configured differently to provide support and impact resistance. For example, with reference to FIG. 5, a structural panel assembly 300 is shown. As the structural panel assembly 300 includes components that are the same or similar to components of the structural panel assembly 100 discussed with regard to FIGS. 1-2, the same reference numerals will be used to denote the same or similar components. In one example, structural panel assembly 300 is shown in greater detail. The structural panel assembly 300 may be coupled to the first surface 22 of each of the longitudinal rails 18 and the cross bars 20 to define the floor panel of the occupant cabin 14 of the vehicle 10, and to enclose an end of the battery storage compartment 16 (FIG. 1). The structural panel assembly 300 provides support for the occupants of the occupant cabin 14, while also providing impact resistance to protect one or more batteries contained within the battery storage compartment 16.

In one example, the structural panel assembly 300 includes the first, top panel 102, the second, bottom panel 104 and a third, intermediate panel 306. In this example, the intermediate panel 306 is composed of the material 406a. The intermediate panel 306 has the thickness T1, which is substantially uniform over the intermediate panel 306. The top panel 102 and the bottom panel 104 are each planar or flat, and each extend along the respective axis A1, A2. The axis A1 is substantially parallel to the axis A2, and in the example of FIG. 5, the axes A1, A2 are substantially perpendicular to a longitudinal axis L3 of the structural panel assembly 300. Generally, each of the top panel 102, the bottom panel 104 and the intermediate panel 306 may be trimmed or cut along an axis parallel to the axes A1, A2 to define the structural panel assembly 300 with the predefined length L1. The structural panel assembly 300 also has the predefined width W. The structural panel assembly 300 has the predefined panel thickness PT.

In one example, the panel thickness PT is defined by the intermediate panel 306. In this example, the intermediate panel 306 has an undulating shape 310, which is defined over the length L1 of the structural panel assembly 300. In one example, the undulating shape 310 includes a plurality of peaks 312 that alternate with a plurality of valleys 314. The peaks 312 are spaced apart from each other by the peak distance PD. A plurality of walls 316 interconnect the peaks 312 and the valleys 314. In this example, each of the walls 316 extend at the angle α relative to the top panel 102. In addition, each of the walls 316 extend at the angle α relative to the bottom panel 104. In this example, each of the walls 316 are solid. Generally, each of the walls 316 are defined to extend at about a 45 degree angle between the top panel 102 and the bottom panel 104 to define a plurality of closed sections or triangles 318 in cross-section when the intermediate panel 306 is coupled to the top panel 102 and the bottom panel 104. The triangles 318 defined by the undulating shape 310 act as trusses, and distribute loads received radially or axially over a surface of the structural panel assembly 300. The formation of the closed sections or triangles 318 also assists in energy absorption, and resists buckling and bending of the structural panel assembly 300. The distribution of loads due to the undulating shape 310 of the intermediate panel 106 protects the batteries contained within the battery storage compartment 16 (FIG. 1), and also enables the structural panel assembly 300 to withstand the weight of the occupants in the occupant cabin 14 (FIG. 1).

In one example, the peaks 312 are coupled to the top panel 102, and the valleys 314 are coupled to the bottom panel 104 such that the triangles 318 are formed to extend along the longitudinal axis L3. In this example, the peaks 312 and the valleys 314 are each coupled to the respective one of the top panel 102 and the bottom panel 104 via a series of welds. Generally, the top panel 102 and the bottom panel 104 are each welded to the intermediate panel 306 via stitch welding or a plurality of line welds 320, which are intermittent or spaced apart in the X-direction (FIG. 6). It should be noted that in other examples, the top panel 102 and the bottom panel 104 may each be welded to the intermediate panel 306 via spot welding or a plurality of spot welds, which are intermittent or spaced apart along the X-direction. Further, it should be noted that the stitch welds or line welds 320, while illustrated herein as linear welds, may also be formed with an oscillating pattern, such as a sinusoid pattern, if desired. The line welds 320 are defined so as to extend in the direction of the longitudinal axis L3, along the top panel 102 at each of the peaks 312 to weld the peaks 312 to the top panel 102. The line welds 320 are defined so as to extend in the direction of the longitudinal axis L3, along the bottom panel 104 at each of the valleys 314 to weld the valleys 314 to the bottom panel 104. The line welds 320 rigidly and fixedly couple the top panel 102 and the bottom panel 104 to the intermediate panel 306. Generally, the line welds 320 are spaced apart in the direction of the longitudinal axis A3 such that the line welds 320 are discrete or non-continuous along the respective one of the peaks 312 and the valleys 314. By providing the line welds 320 that are intermittent or spaced apart, an issue with one of the line welds 320 does not necessarily propagate to another one of the line welds 320. Stated another way, the end of each individual "stitch" or line weld 320 serves as a stopping point in the instance of an issue with the line weld 320. In this example, each of the peaks 312 and each of the valleys 314 include at least one or a plurality of the line welds 320. It should be noted that in other embodiments, one or more of the peaks 312 and/or the valleys 314 may be devoid of line welds 320, and moreover, other types of welds may be used to couple the top panel 102 and the bottom panel 104 to the intermediate panel 306.

In one example, with reference to FIG. 6, a manufacturing system 400 is shown for forming or manufacturing the structural panel assembly 100, 200, 300. In this example, the manufacturing system 400 includes a first, top material coil 402, a second, bottom material coil 404, a third, intermediate material coil 406, at least one forming roller 408, 508, at least one orientation roller 410, at least one thickness setting system 412, a welding system 414, a sensor system 416 and a controller 418. The manufacturing system 400 may also include a cutting system 420. In the example of the structural panel assembly 200, the manufacturing system 400 also includes at least one piercing roller 422. The top material coil 402, the bottom material coil 404, the intermediate material coil 406, the at least one thickness setting system 412, the welding system 414, the sensor system 416 and the cutting system 420 may be in communication with the controller 418 via a suitable communication architecture that supports the transfer of power, data, etc., including, but not limited to a communication bus. It should be noted that in certain embodiments, the manufacturing system 400 may also include a press or at least one pair of press rollers, which are in communication with the top material coil 402 and/or the bottom material coil 404 to receive the respective material 402a, 404a. The press or the at least one pair of press rollers may be employed to add holes or other pierced features to enable the subsequent assembly of the material 402a, 404a to the frame 12 (FIG. 1). The press or the at least one pair of press rollers may also be in communication with the controller 418 via a suitable communication architecture that supports the transfer of power, data, etc., including, but not limited to a communication bus.

The top material coil 402 comprises the material 402a for forming the top panel 102. In this example, the top material coil 402 includes the material 402a, which is formed as a flat or planar continuous sheet and wound into a coil to form a cylinder. The top material coil 402 may include a first central bore 424, which receives a shaft 426 or the like, to enable the top material coil 402 to rotate. For example, the top material coil 402 may be coupled to the shaft 426 and driven by a motor in communication with the controller 418 and responsive to one or more control signals from the controller 418 to rotate at a predetermined speed to feed the material 402a for the top panel 102 to the at least one orientation roller 410. The top material coil 402 may also be supported by a frame or the like coupled to the shaft 434 to support the top material coil 402 during rotation. In one example, the top material coil 402 has a width in a Y-direction that is at least equal to the width W of the structural panel assembly 100, 200, 300. The Y-direction is perpendicular to an X-direction and a Z-direction in a coordinate system 435. The X-direction is parallel to the direction D of travel of the material 402a, 404a, 406a through the manufacturing system 400 and the Z-direction is perpendicular to the direction D of travel and the X-direction.

The bottom material coil 404 comprises the material 404a for forming the bottom panel 104. In this example, the bottom material coil 404 includes the material 404a, which is formed as a flat or planar continuous sheet and wound into a coil to form a cylinder. The bottom material coil 404 may include a second central bore 428, which receives a shaft 430 or the like, to enable the bottom material coil 404 to rotate. For example, the bottom material coil 404 may be coupled to the shaft 430 and driven by a motor in communication with the controller 418 and responsive to one or more control signals from the controller 418 to rotate at a predetermined speed to feed the material 404a for the bottom panel 104 to the at least one orientation roller 410. The bottom material coil 404 may also be supported by a frame or the like coupled to the shaft 434 to support the bottom material coil 404 during rotation. In one example, the bottom material coil 404 has a width in the Y-direction that is at least equal to the width W of the structural panel assembly 100, 200, 300.

The intermediate material coil 406 comprises the material 406a for forming the intermediate panel 106. In this example, the intermediate material coil 406 includes the material 406a, which is formed as a flat or planar continuous sheet and wound into a coil to form a cylinder. The intermediate material coil 406 may include a third central bore 432, which receives a shaft 434 or the like, to enable the intermediate material coil 406 to rotate. For example, the intermediate material coil 406 may be coupled to the shaft 434 and driven by a motor in communication with the controller 418 and responsive to one or more control signals from the controller 418 to rotate at a predetermined speed to feed the material 406a for the intermediate panel 106 to the at least one forming roller 408. The intermediate material coil 406 may also be supported by a frame or the like coupled to the shaft 434 to support the intermediate material coil 406 during rotation. In one example, the intermediate material coil 406 has a width in the Y-direction that is at least equal to the width W of the structural panel assembly 100, 200, 300.

Figure 3:
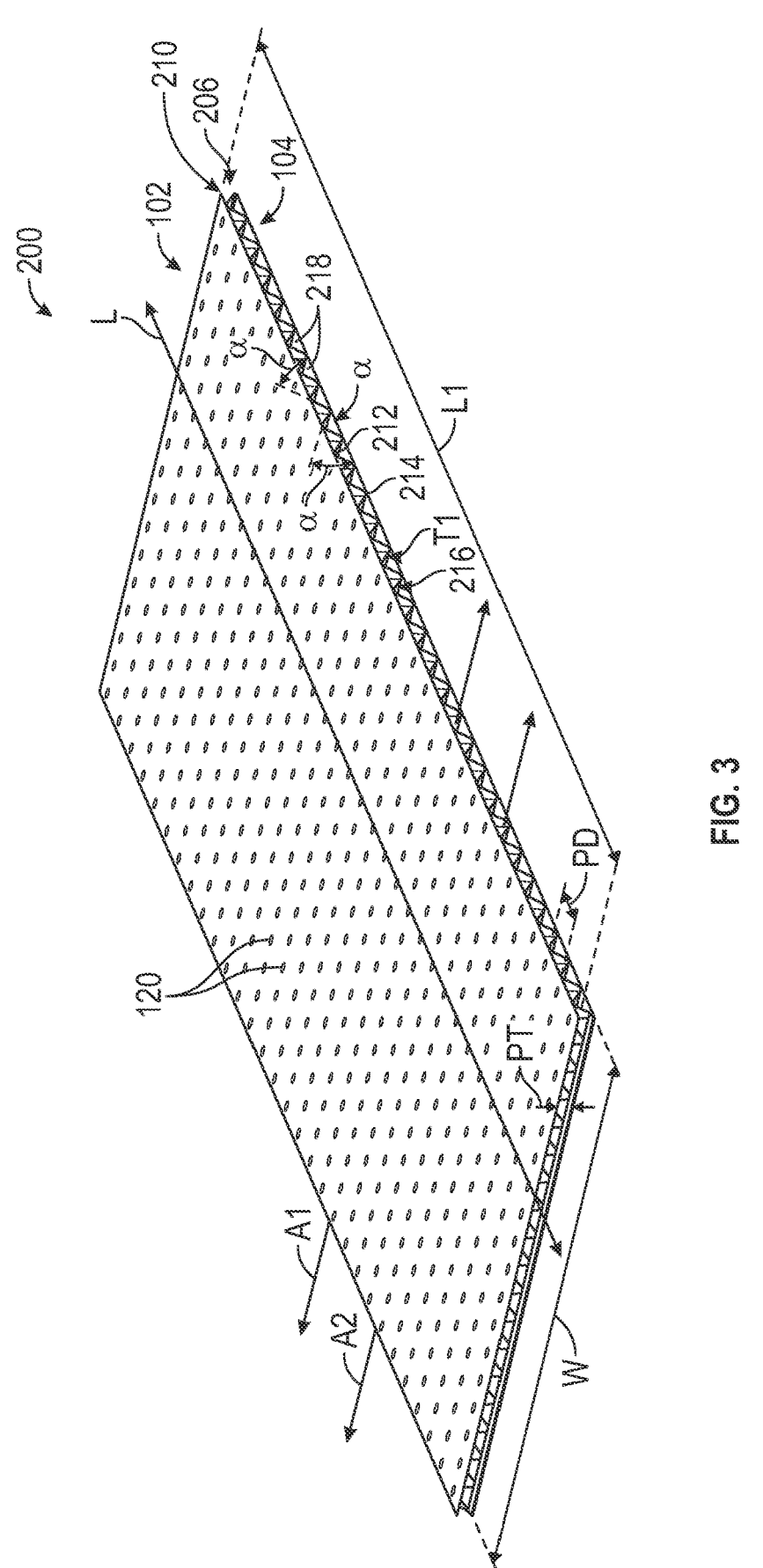
FIG. 3 is a perspective view of another exemplary structural panel assembly for use with the vehicle.

In one example, the at least one forming roller 408 comprises a first forming roller 408a and a second forming roller 408b. The first forming roller 408a is opposite the second forming roller 408b and is positioned upstream from the second forming roller 408b in a direction of travel of the material 406a for the intermediate panel 106, 206. In this example, the first forming roller 408a is offset from the second forming roller 408b. The forming rollers 408a, 408b include a respective plurality of gear teeth 436a, 436b. The gear teeth 436a of the first forming roller 408a are shaped to intermesh with the gear teeth 436b of the second forming roller 408b. In this example, a top land TL associated with each of the gear teeth 436a, 436b extends along an axis that is transverse to a direction of the material 406a of the intermediate material coil 406 such that the undulating shape 110, 210 includes the peaks 112, 212 that are substantially perpendicular to the longitudinal axis L of the structural panel assembly 100, 200 (FIGS. 1 and 3). The forming rollers 408a, 408b may each include a roller central bore 438, which receives a shaft 440 or the like, to enable each of the forming rollers 408a, 408b to rotate. As the material 406a of the intermediate material coil 406 passes through the forming rollers 408a, 408b, the forming rollers 408a, 408b rotate and the gear teeth 436a, 436b cooperate to form the undulating shape 110, 210 in the material 406a of the intermediate panel 106, 206. Generally, the gear teeth 436a, 436b are defined about the circumference of the respective forming roller 408a, 408b with a pitch that defines the peaks 112, 212 and the valleys 114, 214 at the angle α. The forming rollers 408a, 408b may also be supported by a frame or the like that is coupled to the respective shaft 440 to support the forming rollers 408a, 408b during rotation. In one example, the forming rollers 408a, 408b have a width in the Y-direction that is at least equal to the width W of the structural panel assembly 100, 200.

Figure 5:
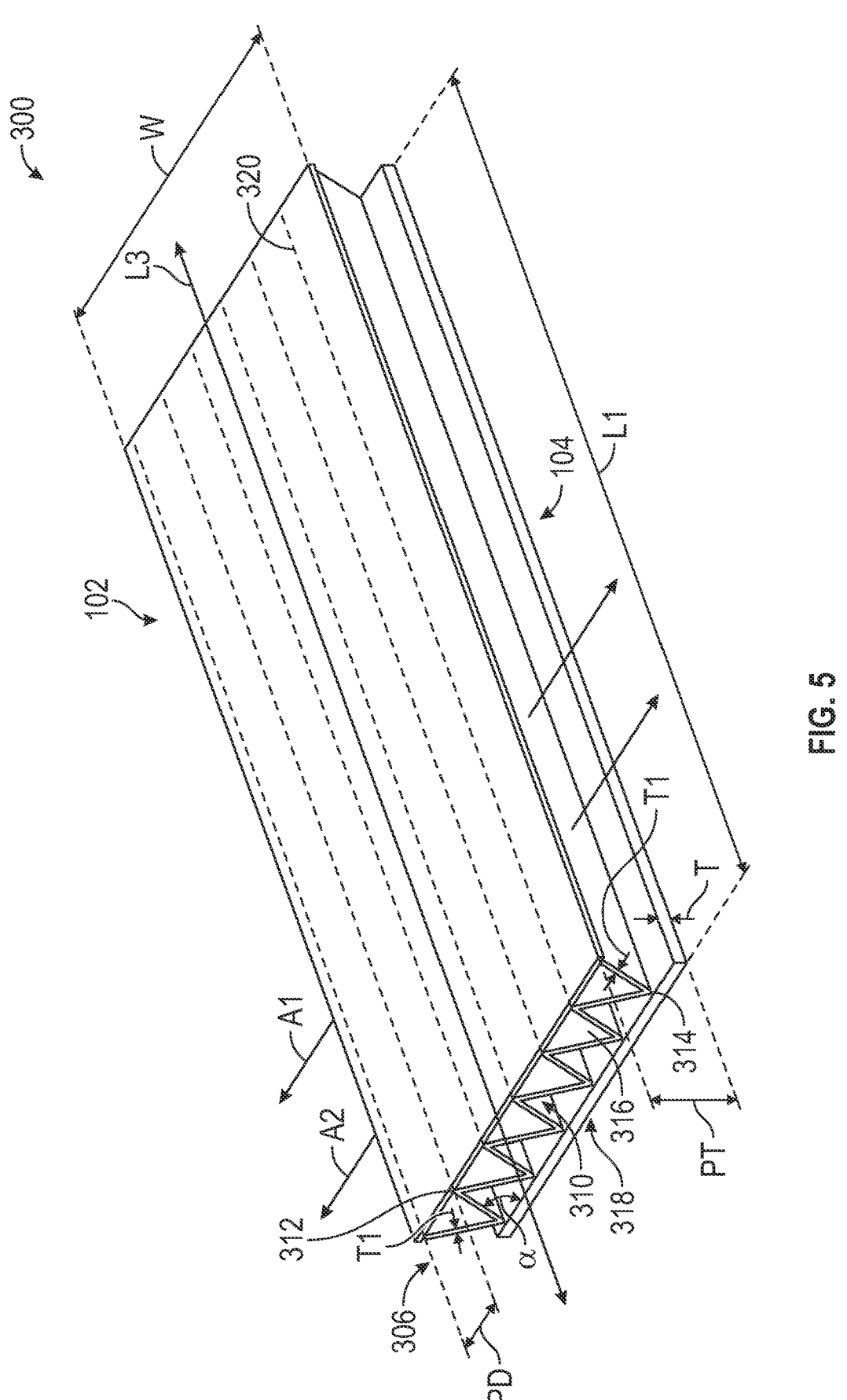
FIG. 5 is a perspective view of another exemplary structural panel assembly for use with the vehicle.
Figure 7:
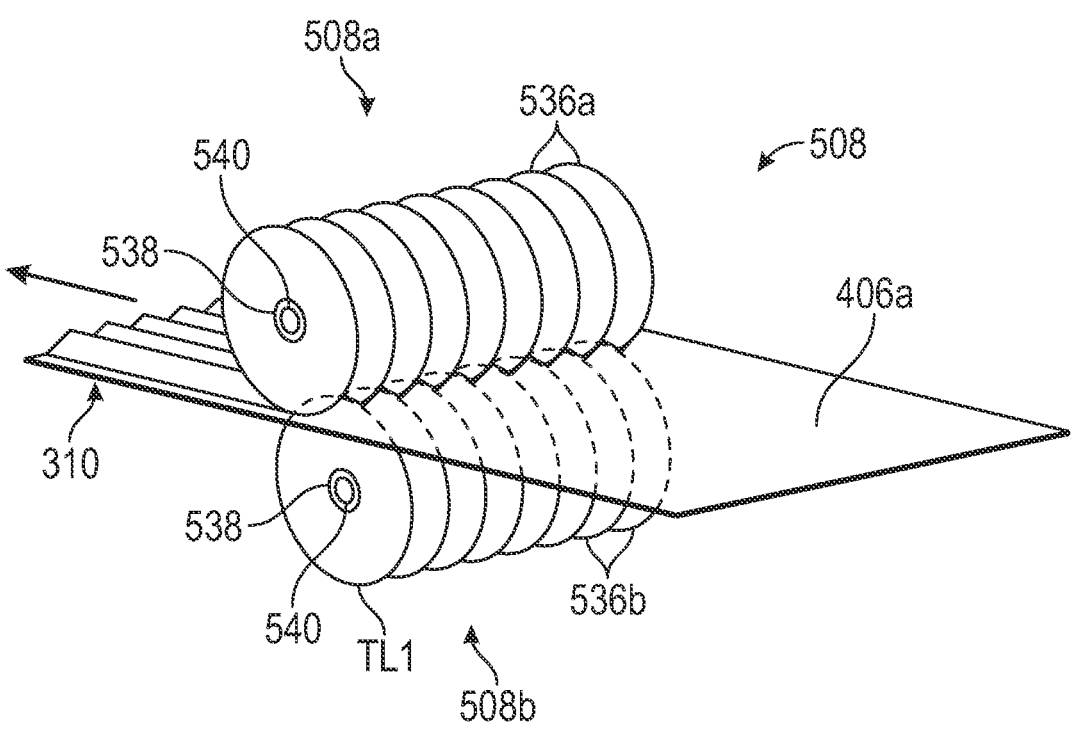
FIG. 7 is a schematic illustration of at least one forming roller for use with the manufacturing system of FIG. 6 to form the structural panel assembly of FIG. 5.

It should be noted that in the instance of the intermediate panel 306, the forming rollers 408a, 408b may be configured differently. For example, with reference to FIG. 7, at least one forming roller 508 is shown. The at least one forming roller 508 comprises a first forming roller 508a and a second forming roller 508b. The first forming roller 508a is opposite the second forming roller 508b and is positioned upstream from the second forming roller 508b in a direction of travel of the material 406a for the intermediate panel 306. In this example, the first forming roller 508a is offset from the second forming roller 508b. The forming rollers 508a, 508b include a respective plurality of gear teeth 536a, 536b. The gear teeth 536a of the first forming roller 508a are shaped to intermesh with the gear teeth 536b of the second forming roller 508b. In this example, a top land TL1 associated with each of the gear teeth 536a, 536b extends along an axis that is parallel to a direction of the material 406a of the intermediate material coil 406 such that the undulating shape 310 includes the peaks 312 that are substantially parallel to the longitudinal axis L3 of the structural panel assembly 300 (FIG. 5). The forming rollers 508a, 508b may each include a roller central bore 538, which receives a shaft 540 or the like, to enable each of the forming rollers 508a, 508b to rotate. As the material 406a of the intermediate material coil 406 passes through the forming rollers 508a, 508b, the forming rollers 508a, 508b rotate and the gear teeth 536a, 536b cooperate to form the undulating shape 310 in the material 406a of the intermediate panel 306. Generally, the gear teeth 536a, 536b are defined about the circumference of the respective forming roller 508a, 508b with a pitch that defines the peaks 312 and the valleys 314 at the angle α. The forming rollers 508a, 508b may also be supported by a frame or the like that is coupled to the respective shaft 540 to support the forming rollers 508a, 508b during rotation. In one example, the forming rollers 508a, 508b have a width in the Y-direction that is at least equal to the width W of the structural panel assembly 300.

With reference back to FIG. 6, the at least one orientation roller 410 comprises a first orientation roller 410a and a second orientation roller 410b. The first orientation roller 410a is opposite the second orientation roller 410b and is spaced apart from the first orientation roller 410a to enable the material 402a of the top panel 102, the of the bottom panel 104 and the undulating shape 110, 210, 310 in the material 406a of the intermediate panel 106, 206, 306. Generally, the orientation rollers 410a, 410b ensure that the material 402a of the top panel 102 and the material 404a of the bottom panel 104, respectively, are axially aligned with the peaks 112, 212, 312 and the valleys 114, 214, 314 of the intermediate panel 106, 206, 306. The orientation rollers 410a, 410b also ensure that the material 402a of the top panel 102 and the material 404a of the bottom panel 104, respectively, are substantially planar and smooth before reaching the welding system 414. Stated another way, the orientation rollers 410a, 410b may remove curvature imparted by the material 402a of the top panel 102 and the material 404a of the bottom panel 104, respectively, being wound into the coil.

The orientation rollers 410a, 410b may each include a second roller central bore 442, which receives a shaft 444 or the like, to enable each of the orientation rollers 410a, 410b to rotate. The orientation rollers 410a, 410b have a substantially smooth outer circumference, which assists aligning the material 402a of the top panel 102 and the material 404a of the bottom panel 104, respectively, while ensuring the material 402a of the top panel 102 and the material 404a of the bottom panel 104 are substantially planar before reaching the welding system 414. As the material 402a of the top panel 102 and the material 404a of the bottom panel 104 pass through the orientation rollers 410a, 410b, the orientation rollers 410a, 410b rotate and the outer circumference of the orientation rollers 410a, 410b cooperates to axially align the material 402a of the top panel 102 and the material 404a of the bottom panel 104, respectively, with the undulating shape 110, 210, 310 in the material 406a of the intermediate panel 106, 206, 306. The orientation rollers 410a, 410b may also be supported by a frame or the like that is coupled to the respective shaft 444 to support the orientation rollers 410a, 410b during rotation. In one example, the orientation rollers 410a, 410b have a width in the Y-direction that is at least equal to the width W of the structural panel assembly 100, 200, 300.

In one example, the at least one thickness setting system 412 includes a first thickness setting system 412a and a second thickness setting system 412b. The first thickness setting system 412a is upstream from the second thickness setting system 412b in the direction D of the flow of the material 402a, 404a, 406a through the manufacturing system 400. Each of the first thickness setting system 412a and the second thickness setting system 412b include a first pressure roller 446, a second pressure roller 448 and a friction plate 450. The first pressure roller 446 and the second pressure roller 448 may each include a third roller central bore 452, which receives a shaft 454 or the like, to enable each of the pressure rollers 446, 448 to rotate. The pressure rollers 446, 448 have a substantially smooth outer circumference, and are controlled, via the controller 418, for example, to apply pressure to the respective one of the material 402a for the top panel 102 and the material 402b for the bottom panel 104. It should be noted that in other examples, the pressure rollers 446, 448 may be fixed relative to the friction plate 450 at the predetermined panel thickness PT and supported on a frame or the like to enable rotation. In one example, the pressure rollers 446, 448 have a width in the Y-direction that is at least equal to the width W of the structural panel assembly 100, 200, 300.

The friction plate 450 is rectangular and has a width in the Y-direction that is at least equal to the width W of the structural panel assembly 100, 200, 300. The friction plate 450 has an axial length FL in the X-direction that is about one to five times the peak-to-peak distance PD, which in one example is about 50 millimeters (mm) to about 500 millimeters (mm). Generally, the axial length FL is predetermined to enable the welding system 414 to couple the material 402a associated with the top panel 102 to the material 406a associated with the bottom panel 104. The friction plate 450 is substantially planar, and cooperates with the pressure rollers 446, 448 to ensure that the material 402a, 404a, 406a for forming the structural panel assembly 100, 200, 300 is welded by the welding system 414 at the predetermined panel thickness PT. In addition, the friction plate 450 cooperates with the pressure rollers 446, 448 to compress the material 402a of the top panel 102 and the material 404a of the bottom panel 104 to the material 406a of the intermediate panel 106, 206, 306 to ensure sufficient contact for the formation of the welds 120, 320.

In the example of the first thickness setting system 412a, the pressure rollers 446, 448 are positioned to contact the material 402a associated with the top panel 102 and the friction plate 450 is positioned to contact the material 404a associated with the bottom panel 104. In the example of the second thickness setting system 412b, the pressure rollers 446, 448 are positioned to contact the material 404a associated with the bottom panel 104 and the friction plate 450 is positioned to contact the material 402a associated with the top panel 102. It should be noted that in other examples, the arrangement may be reversed.

In the example of the first thickness setting system 412a, the first pressure roller 446 is upstream from the second pressure roller 448 in the direction D of the material 402a, 404a, 406a flow through the manufacturing system 400. The pressure rollers 446, 448 of the first thickness setting system 412a are positioned opposite the friction plate 450 of the first thickness setting system 412a. The pressure rollers 446, 448 are spaced apart from each other such that the first pressure roller 446 is opposite a first end of the friction plate 450 and the second pressure roller 448 is opposite a second end of the friction plate 450. The pressure rollers 446, 448 and the friction plate 450 of the first thickness setting system 412a cooperate to ensure the material 402a, 404a, 406a used to form the structural panel assembly 100, 200, 300 is welded with the predetermined the panel thickness PT. In one example, the pressure rollers 446, 448 apply a pressure of about 1.0 pound per square inch (psi) to about 20 pounds per square inch (psi) to the material 402a of the top panel 102 to compress the material 402a, 404a, 406a toward the friction plate 450 of the first thickness setting system 412a to the panel thickness PT and ensure contact between the materials 402a, 404a, 406a during welding. The values for the pressure provided are merely examples, as the pressure applied by the pressure rollers 446, 448 is predefined based on the thickness T1 of the intermediate panel 106, 206, 306, the width W of the structural panel assembly 100, 200, 300 and the predetermined amount of compression to achieve contact between the material 402a, 404a, 406a during welding.

In the example of the second thickness setting system 412b, the first pressure roller 446 is upstream from the second pressure roller 448 in the direction D of the material 402a, 404a, 406a flow through the manufacturing system 400. The pressure rollers 446, 448 of the second thickness setting system 412b are positioned opposite the friction plate 450 of the second thickness setting system 412b. The pressure rollers 446, 448 are spaced apart from each other such that the first pressure roller 446 is opposite a first end of the friction plate 450 and the second pressure roller 448 is opposite a second end of the friction plate 450. The pressure rollers 446, 448 and the friction plate 450 of the of the second thickness setting system 412b cooperate to ensure the material 402a, 404a, 406a used to form the structural panel assembly 100, 200, 300 is welded with the predetermined the panel thickness PT. In one example, the pressure rollers 446, 448 apply a pressure of about 1.0 pound per square inch (psi) to about 20 pounds per square inch (psi) to the material 404a of the bottom panel 104 to compress the material 402a, 404a, 406a toward the friction plate 450 of the second thickness setting system 412b to the panel thickness PT and ensure contact between the materials 402a, 404a, 406a during welding. The values for the pressure provided are merely examples, as the pressure applied by the pressure rollers 446, 448 is predefined based on the thickness T1 of the intermediate panel 106, 206, 306, the width W of the structural panel assembly 100, 200, 300 and the predetermined amount of compression to achieve contact between the material 402a, 404a, 406a during welding.

As the material 402a of the top panel 102, the material 406a of the intermediate panel 106, 206, 306 and the material 404a of the bottom panel 104 pass through the first thickness setting system 412a, the first pressure roller 446 applies the pressure to the material 402a associated with the top panel 102 as it rotates to move the material 402a toward the friction plate 450, and thus, the material 406a associated with the intermediate panel 106, 206, 306 and the material 404a associated with the bottom panel 104. As will be discussed, as the assembly of the materials 402a, 404a, 406a continue to move in the direction D, the welding system 414 welds the material 402a associated with the top panel 102 to the material 406a associated with the intermediate panel 106, 206, 306. The second pressure roller 448 applies the pressure to the material 402a associated with the top panel 102 as it rotates to retain the assembly of the materials 402a, 404a, 406a at the predetermined panel thickness PT and ensure contact between the materials 402a, 404a, 406a. As the material 402a of the top panel 102, the material 406a of the intermediate panel 106, 206, 306 and the material 404a of the bottom panel 104 continue to move in the direction D, the material 402*a*, 404*a*, 406*a* passes through the second thickness setting system 412*b*. The first pressure roller 446 applies the pressure to the material 404*a* associated with the bottom panel 104 as it rotates to move the material 404*a* toward the friction plate 450, and thus, the material 406*a* associated with the intermediate panel 106, 206, 306 and the material 402*a* associated with the top panel 102. As will be discussed, as the assembly of the materials 402*a*, 404*a*, 406*a* continue to move in the direction D, the welding system 414 welds the material 404*a* associated with the bottom panel 104 to the material 406*a* associated with the intermediate panel 106, 206, 306. The second pressure roller 448 applies the pressure to the material 404*a* associated with the bottom panel 104 as it rotates to retain the assembly of the materials 402*a*, 404*a*, 406*a* at the predetermined panel thickness PT and ensure contact between the materials 402*a*, 404*a*, 406*a*.

In one example, the welding system 414 includes a first welding subsystem 414*a* and a second welding subsystem 414*b*. The first welding subsystem 414*a* cooperates with the first thickness setting system 412*a*, while the second welding subsystem 414*b* cooperates with the second thickness setting system 412*b*. Each of the first welding subsystem 414*a* and the second welding subsystem 414*b* include at least one or a plurality of laser welding machines or laser welders 460. Each of the laser welders 460 is responsive to one or more control signals from the controller 418 to output a laser beam to couple or weld the top panel 102 and the bottom panel 104, respectively, to the intermediate panel 106, 206, 306.

Figure 8:
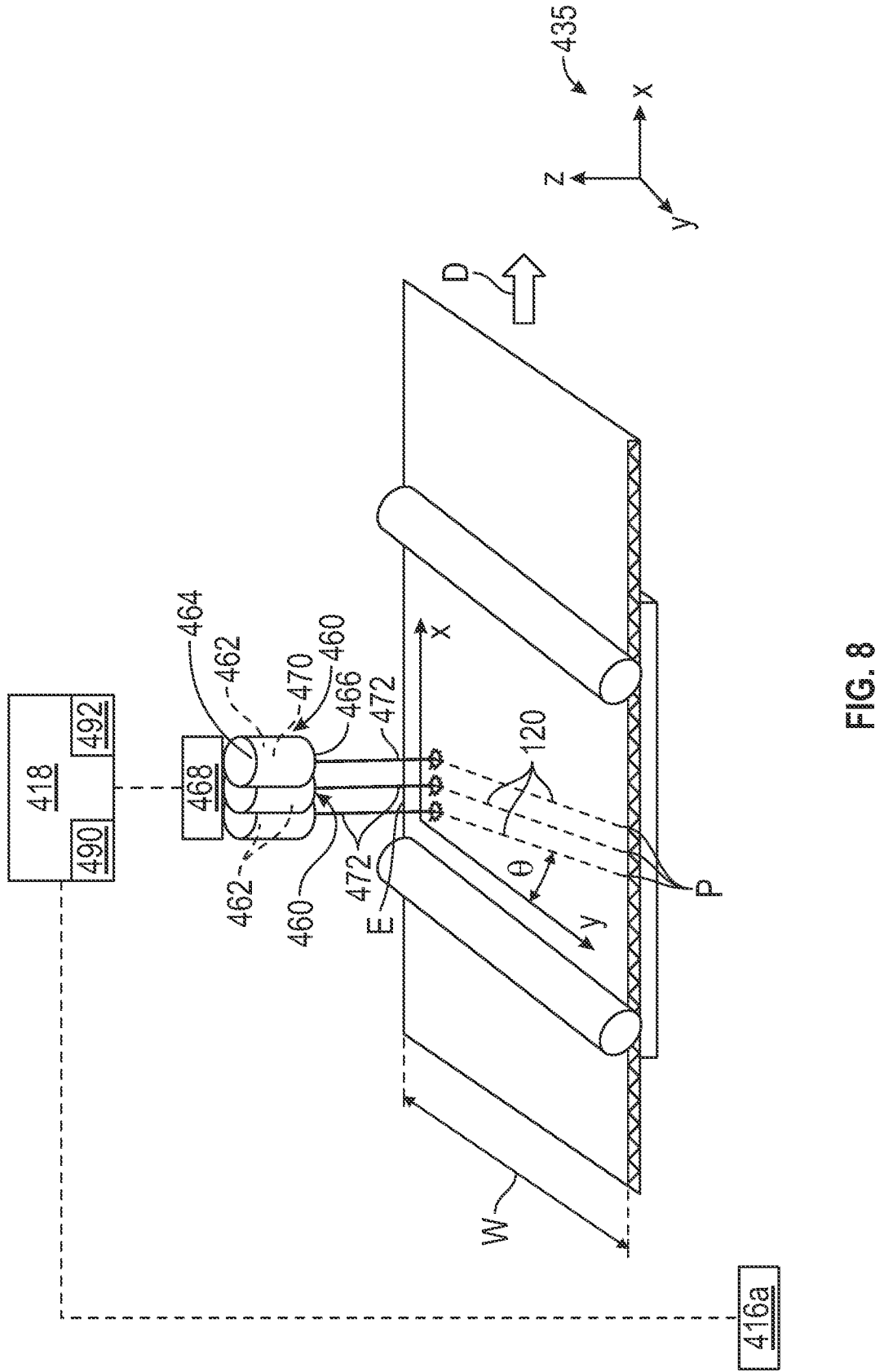
FIG. 8 is a schematic top view of a portion of the manufacturing system of FIG. 6.

Generally, with reference to FIG. 8, a schematic illustration of the first welding subsystem 414*a* and the first thickness setting system 412*a* is shown. As the first welding subsystem 414*a* and the first thickness setting system 412*a* are each the same as the second welding subsystem 414*b* and the second thickness setting system 412*b*, respectively, but orientated about 180 degrees in order to weld the material 404*a* associated with the bottom panel 104 to the material 406*a* associated with the intermediate panel 106, 206, 306, the second welding subsystem 414*b* and the second thickness setting system 412*b* will not be discussed in detail herein for the sake of brevity.

In this example, the first welding subsystem 414*a* includes three laser welders 460, which are controlled by the controller 418 to move substantially in unison to couple or weld the material 402*a* to the material 406*a*. Each of the laser welders 460 include a light source 462, a reflector 464, optics 466 and a power supply 468. The light source 462 is powered and controlled by the power supply 468 and the controller 418 to generate light into a resonant cavity 470. The light is expanded and reflected by the reflector 464 through the optics 466 to emerge as a concentrated laser beam 472 focused to a point at the material 402*a* associated with the top panel 102. Each laser welder 460 is configured to apply the laser beam 472 at a weld location to form a weld to join the material 402*a* associated with the top panel 102 to the material 406*a* associated with the intermediate panel 106, 206, 306. Generally, the laser welders 460 may be controlled by the controller 418 to produce a predetermined type of weld at the weld location, including, but not limited to, the stitch weld or the line weld 120, 320. It should be noted that the illustration of the laser welders 460 in FIG. 8 is merely exemplary as the light source 462 may be configured as stand-alone equipment standing on the floor, with fiber optics delivering the laser beam 472 from the light source 462 to the optics 466 for laser welding.

Generally, the movement of the laser welders 460 is substantially linear in nature and the laser welders 460 have only one degree-of-freedom, which is the position of the laser welders 460 along their respective linear path. In one example, a carriage assembly supported by linear rails and/or linear bearings may be used to move each of the laser welders 460 along the linear path. The carriage assembly that supports the laser welders 460 may be moved along the linear rails and/or linear bearings by a motor, which is responsive to one or more control signals from the controller 418. The motor is in communication with the controller 418 over a suitable communication architecture that supports the transfer of power, data, etc., including, but not limited to a communication bus. In one example, the motor is, but is not limited to, a servomotor, a stepper motor or other motor, and the rotary output of the motor may be converted into a linear movement of the carriage assembly by a lead screw and nut, a ball screw, a chain-and-sprocket, a toothed belt, and pulleys, or the like. Alternatively, an industrial manufacturing robot may be coupled to the carriage assembly and responsive to one or more control signals from the controller 418 to move the laser welders 460.

In the example of the stitch weld or the line weld 120, 320 as shown in FIGS. 2, 3, 5 and 8, the laser welders 460 are controlled to move the laser beam 472 across the material 402*a* along a predetermined weld path P. In this example, the laser welders 460 include an actuator 474, which is responsive to one or more control signals from the controller 418 to move the laser welders 460 along the weld path P. The actuator 474 is any suitable actuator, including, but not limited to a servomotor, a stepper motor, etc. In this example, the weld path P is defined transverse or oblique to the direction D of travel of the material 402*a*, 404*a*, 406*a* through the manufacturing system 400. In one example, the weld path P of the laser welders 460 is defined at a pitch angle $\theta$ relative to the Y-direction. The pitch angle $\theta$ is defined by the following equation:

$$\theta = a\tan\frac{PDN}{W} \tag{1}$$

Wherein PD is the predetermined peak distance defined between the adjacent peaks 112, 212, 312; N is the number of laser welders 460; and W is the predefined width W of the resulting structural panel assembly 100, 200, 300. Generally, the pitch angle defines the weld path P of the laser welders 460 relative to the transverse or Y-direction. As the laser welders 460 move along the weld path P, the laser welders 460 are controlled by the controller 418 to output the laser beam 472 to weld the material 402*a* associated with the top panel 102 to the material 406*a* associated with the intermediate panel 106, 206, 306. Generally, a position of each of the laser welders 460 in the X-direction (x-coordinate) and the Y-direction (y-coordinate) is known from a position sensor associated with the actuator 474, including, but not limited to an encoder. Each of the laser welders 460 are also in communication with the controller 418 to transmit the position of the laser welders 460 in (x, y) coordinates to the controller 418.

With reference back to FIG. 6, the sensor system 416 includes one or more sensing devices 416*a*-416*n* that sense observable conditions of the manufacturing system 400. In various embodiments, the sensing devices 416*a*-416*n* include, but are not limited to, optical cameras (e.g., forward facing, 360-degree, rear-facing, side-facing, stereo, etc.), odometry sensors (e.g., encoders) and/or other sensors that might be utilized in connection with systems and methods in accordance with the present subject matter. In one example, the sensing devices 40a-40n include a first optical camera 416a and a second optical camera 416b. Generally, the first optical camera 416a and the second optical camera 416b are each a stereo camera assembly capable of capturing stereo images with depth information. For example, the first optical camera 416a and the second optical camera 416b may each include a stereo camera with two or more lenses and image sensors arranged to capture stereoscopic images about the manufacturing system 400 with depth information. In this example, the first optical camera 416a is a stereo camera assembly for capturing images of the assembly of the material 402a, 404a, 406a as the material is welded by the first welding subsystem 414a. Generally, the first optical camera 416a is mounted, via a frame or other supporting structure, to observe the peaks 112, 212, 312 and the laser welders 460 as the laser welders 460 weld the material 402a associated with the top panel 102 to the material 406a associated with the intermediate panel 106, 206, 306. The second optical camera 416b is a stereo camera assembly for capturing images of the assembly of the material 402a, 404a, 406a as the material is welded by the second welding subsystem 414b. Generally, the second optical camera 416b is mounted, via a frame or other supporting structure, to observe the valleys 114, 214, 314 and the laser welders 460 as the laser welders 460 weld the material 404a associated with the bottom panel 104 to the material 406a associated with the intermediate panel 106, 206, 306. By observing the peaks 112, 212, 312 and the valleys 114, 214, 314 of the material 406a associated with the intermediate panel 106, 206, 306 and the laser welders 460 of the welding system 414, the image data from the optical cameras 416a, 416b may be used to determine whether the laser welders 460 are welding the material 402a, 404a associated with the respective one of the top panel 102 and the bottom panel 104 to the peaks 112, 212, 312 and the valleys 114, 214, 314, respectively, of the material 406a associated with the intermediate panel 106, 206, 306. Images may be captured by the optical cameras 416a, 416b according to various timings or other considerations. In certain examples, the optical cameras 416a, 416b may capture images continuously as the material 402a, 404a, 406a moves through the manufacturing system 400 (based on one or more control signals from the controller 418).

It should be noted that while two optical cameras 416a, 416b are shown and described herein, the sensor system 416 may include any number of optical cameras to observe the manufacturing system 400. In addition, while described herein as comprising stereo camera assemblies, the optical cameras 416a, 416b may comprise mono camera assemblies or some other type of sensor capable of providing real-time information as to the position of the peaks 112, 212, 312 and the valleys 114, 214, 314 of the material 406a in order synchronize the movement of the laser welders 460 to the movement of the material 406a. It should also be noted that the sensor system 416 may also be used to confirm quality of the manufacturing process, or as a quality check, to ensure that the final locations of the line welds 120 relative to the peaks 112, 212, 312 and the valleys 114, 214, 314 is uniform and consistent.

The manufacturing system 400 may also include a cutting system 420. Once the material 402a, 404a, 406a is welded to the predetermined panel thickness PT by the welding system 414, the cutting system 420 may be employed to cut the material 402a, 404a, 406a into the structural panel assembly 100, 200, 300, which has a desired length for coupling to the vehicle 10 (FIG. 1). Generally, the cutting system 420 is a suitable mechanical cutting system, including, but not limited to, a shear, saw, abrasive cutter, a water-jet cutter, a laser cutter, a plasma cutter, or CNC mill. The cutting system 420 trims the continuous output of assembled material 402a, 404a, 406a exiting the second thickness setting system 412b into individual structural panel assemblies 100, 200, 300 suitable for installation into the vehicle 10. In one example, the cutting system 420 is responsive to one or more control signals from the controller 418 to actuate and slice through the material 402a, 404a, 406a to define the structural panel assembly 100, 200, 300.

In the example of the structural panel assembly 200, the manufacturing system 400 also includes at least one piercing roller 422. The at least one piercing roller 422 may be synchronized with the at least one forming roller 408. In one example, the at least one piercing roller 422 comprises a first piercing roller 422a and a second piercing roller 422b. The first piercing roller 422a is opposite the second piercing roller 422b and is positioned upstream from the second piercing roller 422b in the direction D of travel of the material 406a for the intermediate panel 206. In this example, the first piercing roller 422a is offset from the second piercing roller 422b. The piercing rollers 422a, 422b include a respective plurality of piercing teeth 480a, 480b. The piercing teeth 480a of the first piercing roller 422a are shaped to cooperate with the piercing teeth 480b of the second piercing roller 422b, and for example, the piercing teeth 480a may include male piercing teeth while the piercing teeth 480b include female piercing teeth. In this example, each of the piercing teeth 480a, 480b extend along an axis that is transverse to a direction of the material 406a of the intermediate material coil 406 such that the openings 220 extend along an axis that is substantially perpendicular to the longitudinal axis L of the structural panel assembly 200 (FIG. 3). The piercing rollers 422a, 422b may each include a piercing central bore 482, which receives a shaft 484 or the like, to enable each of the piercing rollers 422a, 422b to rotate. As the material 406a of the intermediate material coil 406 passes through the piercing rollers 422a, 422b, the piercing rollers 422a, 422b rotate and the piercing teeth 480a, 480b cooperate to form the openings 220 in the material 406a associated with the intermediate panel 206. Generally, the piercing teeth 480a, 480b are defined about the circumference of the respective piercing roller 422a, 422b. The piercing rollers 422a, 422b may also be supported by a frame or the like that is coupled to the respective shaft 484 to support the piercing rollers 422a, 422b during rotation. In one example, the piercing rollers 422a, 422b have a width in the Y-direction that is at least equal to the width W of the structural panel assembly 200.

The controller 418 includes at least one processor 490 and a computer-readable storage device or media 492. The processor 490 may be any custom-made or commercially available processor, a central processing unit (CPU), a graphics processing unit (GPU), an application specific integrated circuit (ASIC) (e.g., a custom ASIC implementing a neural network), a field programmable gate array (FPGA), an auxiliary processor among several processors associated with the controller 418, a semiconductor-based microprocessor (in the form of a microchip or chip set), any combination thereof, or generally any device for executing instructions. The computer readable storage device or media 492 may include volatile and nonvolatile storage in read-only memory (ROM), random-access memory (RAM), and keep-alive memory (KAM), for example. KAM is a persistent or non-volatile memory that may be used to store various operating variables while the processor 490 is powered down. The computer-readable storage device or media 492 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 418 in controlling the manufacturing system 400. In various embodiments, controller 418 is configured to implement instructions of a manufacturing control system 600 as discussed in detail below. In various embodiments, the instructions, when executed by the processor 490, receive and process sensor data from the sensor system 416 and data received from other modules associated with the manufacturing system 400 to control at least the laser welders 460.

Figure 9:
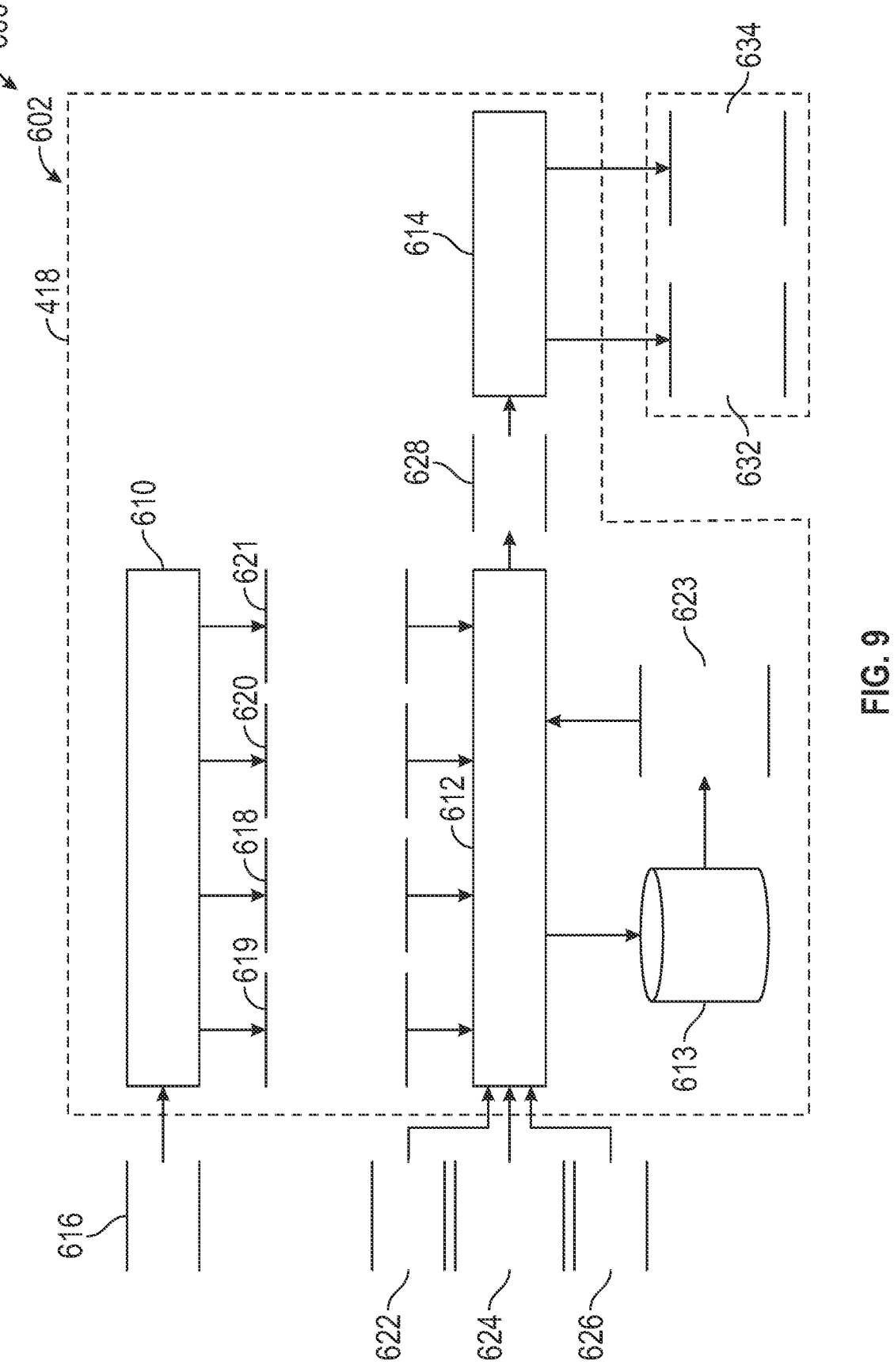
FIG. 9 is a dataflow diagram illustrating a control module associated with a manufacturing control system of the manufacturing system in accordance with various embodiments.

As shown in more detail with regard to FIG. 9 and with continued reference to FIGS. 1-8, a dataflow diagram illustrates an embodiment of a control module 602 of the manufacturing control system 600, which may be implemented by or incorporated into the controller 418 and/or the processor 490. In various embodiments, the control module 602 may be implemented as one or more sub-modules. Various embodiments of the control module 602 according to the present disclosure can include any number of submodules embedded within the controller 418. As can be appreciated, the sub-modules shown in FIG. 9 can be combined and/or further partitioned to control the laser welders 460. Data inputs to the control module 602 may be received from the sensor system 416 (FIGS. 6 and 8), received from other control modules (not shown) associated with the manufacturing system 400, and/or determined/modeled by other sub-modules (not shown) within the controller 418. In various embodiments, the control module 602 includes an intermediate panel monitor module 610, a welder speed determination module 612, a speed datastore 613, and a laser welder control module 614.

The intermediate panel monitor module 610 receives as input sensor data 616. In one example, the sensor data 616 comprises the image data from the first optical camera 416a and the second optical camera 416b. The intermediate panel monitor module 610 processes the sensor data 616 and determines a position of the peaks 112, 212, 312 and the laser welders 460 in the image data from the first optical camera 416a. For example, the intermediate panel monitor module 610 determines, based on the image data, the position of the peaks 112, 212, 312 in (x, y) coordinates and the position of the laser welders 460 in (x, y) coordinates. The intermediate panel monitor module 610 sets the position of the peaks 112, 212, 312 in the (x, y) coordinates as peak position data 618 for the welder speed determination module 612. The peak position data 618 is the observed position of the peaks 112, 212, 312 of the material 406a associated with the intermediate panel 106, 206, 306 in the X-direction and the Y-direction or in (x, y) coordinates. The intermediate panel monitor module 610 processes the sensor data 616 and determines a position of the laser welder 460 of the first welding subsystem 414a in the image data from the first optical camera 416a. The intermediate panel monitor module 610 sets the position of the laser welder 460 of the first welding subsystem 414a in the (x, y) coordinates as first welder position data 619 for the welder speed determination module 612. The first welder position data 619 is the observed position of the laser welder 460 of the first welding subsystem 414a in the X-direction and the Y-direction or in (x, y) coordinates.

The intermediate panel monitor module 610 also processes the sensor data 616 and determines a position of the valleys 114, 214, 314 and the laser welders 460 in the image data from the second optical camera 416b. For example, the intermediate panel monitor module 610 determines, based on the image data, the position of the valleys 114, 214, 314 in (x, y) coordinates and the position of the laser welders 460 in (x, y) coordinates. The intermediate panel monitor module 610 sets the position of the valleys 114, 214, 314 in the (x, y) coordinates as valley position data 620 for the welder speed determination module 612. The valley position data 620 is the observed position of the valleys 114, 214, 314 of the material 406a associated with the intermediate panel 106, 206, 306 in the X-direction and the Y-direction or in (x, y) coordinates. The intermediate panel monitor module 610 processes the sensor data 616 and determines a position of the laser welder 460 of the second welding subsystem 414b in the image data from the second optical camera 416b. The intermediate panel monitor module 610 sets the position of the laser welder 460 of the second welding subsystem 414b in the (x, y) coordinates as second welder position data 621 for the welder speed determination module 612. The second welder position data 621 is the observed position of the laser welder 460 of the second welding subsystem 414b in the X-direction and the Y-direction or in (x, y) coordinates. In one example, the position of the peaks 112, 212, 312 and the laser welders 460 in the images captured by the first optical camera 416a and the second optical camera 416b may be determined by pattern-recognition algorithms that identify the differences in brightness, color, and/or saturation between adjacent groups of pixels in the captured images to infer the position of the peaks 112, 212, 312 and the laser welders 460, however, other methods may be employed.

The speed datastore 613 stores data of a current speed of the laser welders 460 of the first welding subsystem 414a and the second welding subsystem 414b, and in one example, the speed datastore 613 stores current speed data 623. In one example, the current speed data 623 is populated by the welder speed determination module 612.

The welder speed determination module 612 receives as input sheet data 622. The sheet data 622 is data associated with the structural panel assembly 100, 200, 300 manufactured by the manufacturing system 400. For example, the sheet data 622 includes the predetermined peak distance PD defined between the adjacent peaks 112, 212, 312 and the predetermined width W of the resulting structural panel assembly 100, 200, 300. The sheet data 622 may be received from another module associated with the control module 602 and/or may be received via input to a human-machine interface associated with the manufacturing system 400. The sheet data 622 may also be predefined or factory-set values, which are stored in a datastore associated with the control module 602.

The welder speed determination module 612 receives as input laser welder data 624. The laser welder data 624 is data associated with the laser welders 460 of each of the first welding subsystem 414a and the second welding subsystem 414b. In one example, the laser welder data 624 comprises N or the number of laser welders 460 associated with each of the first welding subsystem 414a and the second welding subsystem 414b; a position of the laser welders 460 of the first welding subsystem 414a from the position sensor associated with each of the laser welders 460; a position of the laser welders 460 of the second welding subsystem 414b from the position sensor associated with each of the laser welders 460; an initial, start position for the laser welders 460 of each of the first welding subsystem 414a and the second welding subsystem 414*b*; and a maximum position for the laser welders 460 of each of the first welding subsystem 414*a* and the second welding subsystem 414*b*. The number of laser welders 460 associated with each of the first welding subsystem 414*a* and the second welding sub-system 414*b* may be received from another module associ-ated with the control module 602 and/or may be received via input to a human-machine interface associated with the manufacturing system 400. The number of laser welders 460 associated with each of the first welding subsystem 414*a* and the second welding subsystem 414*b* may also be predefined or factory-set values, which are stored in a datastore asso-ciated with the control module 602. The position of the laser welders 460 of the first welding subsystem 414*a* and the position of the laser welders 460 of the second welding subsystem 414*b* may be received from the position sensor of the actuator 474 associated with the laser welders 460 of each of the first welding subsystem 414*a* and the second welding subsystem 414*b*. The start position and the maxi-mum position for each of the laser welders 460 of each of the first welding subsystem 414*a* and the second welding sub-system 414*b* may be received from another module associ-ated with the control module 602 and/or may be received via input to a human-machine interface associated with the manufacturing system 400. The start position and the maxi-mum position for each of the laser welders 460 of each of the first welding subsystem 414*a* and the second welding sub-system 414*b* may also be predefined or factory-set values, which are stored in a datastore associated with the control module 602. In one example, the start position of the first welding subsystem 414*a* and the start position for the second welding subsystem 414*b* is about 10 millimeters (mm) in the Y-direction for the structural panel assembly 100, 200, 300 with the width W (or Y=10), with Y=0 at an edge E of the structural panel assembly 100, 200, 300. In one example, the maximum position of the first welding subsystem 414*a* and the maximum position for the second welding subsystem 414*b* is about the width W minus 10 millimeters (mm) in the Y-direction for the structural panel assembly 100, 200, 300 with the width W (or W-10).

Based on the position of the laser welders 460 associated with the first welding subsystem 414*a*, the welder speed determination module 612 determines whether the laser welders 460 are at the start position. Based on the position of the laser welders 460 associated with the second welding subsystem 414*b*, the welder speed determination module 612 determines whether the laser welders 460 are at the start position for the second welding subsystem 414*b*. Based on the laser welders 460 of the first welding subsystem 414*a* and the second welding subsystem 414*b* being at the start position, the welder speed determination module 612 deter-mines or calculates the pitch angle θ of the weld path P of the laser welders 460 of each of the first welding subsystem 414*a* and the second welding subsystem 414*b* using equa-tion (1), above. The welder speed determination module 612 receives as input line data 626. The line data 626 is data associated with the manufacturing system 400, and in one example, comprises a speed of rotation of the top material coil 402, the bottom material coil 404 and the intermediate material coil 406. Generally, each of the top material coil 402, the bottom material coil 404 and the intermediate material coil 406 rotate at the same speed such that the material 402*a*, 404*a*, 406*a* is fed to the thickness setting system 412 and the welding system 414 at substantially the same speed. In one example, the line data 626 is about one foot per second. The line data 626 may be received from another module associated with the control module 602 and/or may be received via input to a human-machine interface associated with the manufacturing system 400. The line data 626 may also be a predefined or factory-set value, which is stored in a datastore associated with the control module 602.

Based on the determined pitch angle θ and the line data 626, the welder speed determination module 612 determines or calculates a baseline speed for the laser welders 460 of each of the first welding subsystem 414*a* and the second welding subsystem 414*b*. In one example, the baseline speed for the laser welders 460 is calculated using the following equation:

$$BaseSpeed = \frac{S}{\sin\theta} \qquad (2)$$

Wherein the BaseSpeed is the baseline speed of the laser welders 460; S is the speed of rotation of the top material coil 402, the bottom material coil 404 and the intermediate material coil 406 provided by the line data 626; and θ is the pitch angle determined using equation (1). The welder speed determination module 612 sets the baseline speed deter-mined using equation (2) as speed data 628 for the laser welder control module 614 and stores the speed data 628 as the current speed data 623. The speed data 628 is the speed for the actuators 474 to move the laser welders 460 along the weld path P.

Based on the position of the laser welders 460 associated with the first welding subsystem 414*a*, the welder speed determination module 612 determines whether the laser welders 460 are at the maximum position. Based on the position of the laser welders 460 associated with the second welding subsystem 414*b*, the welder speed determination module 612 determines whether the laser welders 460 are at the maximum position for the second welding subsystem 414*b*. If the laser welders 460 of the first welding subsystem 414*a* are not at the maximum position, the welder speed determination module 612 receives as input the peak posi-tion data 618 and the first welder position data 619. The welder speed determination module 612 subtracts the deter-mined X-position (or x-coordinate) of the peak 112, 212, 312 from the peak position data 618 from the X-position (or x-coordinate) of the position of the laser welders 460 of the first welding subsystem 414*a* to determine an error value. Generally, the error value indicates whether an error exists between the position of the peak 112, 212, 312 and the position of the laser welders 460 in the X-direction such that the laser welders 460 are ahead of the peak 112, 212, 312 (or leading the material 406*a*; negative error value) or the laser welders 460 are behind of the peak 112, 212, 312 (or lagging the material 406*a*; positive error value). If the laser welders 460 of the second welding subsystem 414*b* and the second welding subsystem 414*b* are not at the maximum position, the welder speed determination module 612 receives as input the valley position data 620 and the second welder position data 621. The welder speed determination module 612 subtracts the determined X-position (or x-coordinate) of the valley 114, 214, 314 from the valley position data 620 from the X-position (or x-coordinate) of the position of the laser welders 460 of the second welding subsystem 414*b* to determine an error value. Generally, the error value indicates whether an error exists between the position of the valley 114, 214, 314 and the position of the laser welders 460 in the X-direction such that the laser welders 460 are ahead of the valley 114, 214, 314 (or leading the material 406*a*; negative error value) or the laser welders 460 are behind of the valley 114, 214, 314 (or lagging the material 406*a*; positive error value).

Based on the determination that there is an error in the position of the laser welders 460 of the first welding subsystem 414*a* and/or the second welding subsystem 414*b*, the welder speed determination module 612 applies a proportional, integral and derivative (PID) algorithm to determine a correction term. In one example, the PID algorithm is defined by the following equation:

$$u(t) = K_p e(t) + K_i \int e(t) dt + K_d \frac{de}{dt} \qquad (3)$$

Wherein u(t) is the correction term; $K_p$ is the proportional gain, which is a predefined, factory-set value; $K_i$ is the integral gain, which is a predefined, factory-set value; e(t) is the error value between the X-position of the peak 112, 212, 312 and the X-position of the laser welders 460 of the first welding subsystem 414*a* or the X-position of the valley 114, 214, 314 and the X-position of the laser welders 460 of the second welding subsystem 414*b*, respectively; t is the time, which may be obtained from the sensor data 616 or obtained from another module associated with the control module 602; and $K_d$ is the derivative gain, which is a predefined, factory-set value.

The welder speed determination module 612 queries the speed datastore 613 and retrieves the current speed data 623. The welder speed determination module 612 adds the correction term determined by the PID algorithm to the current speed to determine a new speed for the actuators 474 to move the laser welders 460 of the first welding subsystem 414*a* and/or the second welding subsystem 414*b*. The welder speed determination module 612 sets the new speed for the actuators 474 to move the laser welders 460 of the first welding subsystem 414*a* and/or the second welding subsystem 414*b* as the speed data 628 for the laser welder control module 614. The welder speed determination module 612 stores the new speed in the speed datastore 613 as the current speed data 623 for the laser welders 460 of each of the first welding subsystem 414*a* and the second welding subsystem 414*b*.

The laser welder control module 614 receives as input the speed data 628 for the actuators 474 to move the laser welders 460 of the respective one of the first welding subsystem 414*a* and the second welding subsystem 414*b*. Based on the speed data 628 received for the laser welders 460 of the first welding subsystem 414*a*, the laser welder control module 614 outputs first control data 632. The first control data 632 is data of one or more control signals for the actuator 474 of the first welding subsystem 414*a* to move the laser welders 460 of the first welding subsystem 414*a* at the determined speed. Based on the speed data 628 received for the laser welders 460 of the second welding subsystem 414*b*, the laser welder control module 614 outputs second control data 634. The second control data 634 is data of one or more control signals for the actuator 474 of the second welding subsystem 414*b* to move the laser welders 460 of the second welding subsystem 414*b* at the determined speed.

Figure 10:
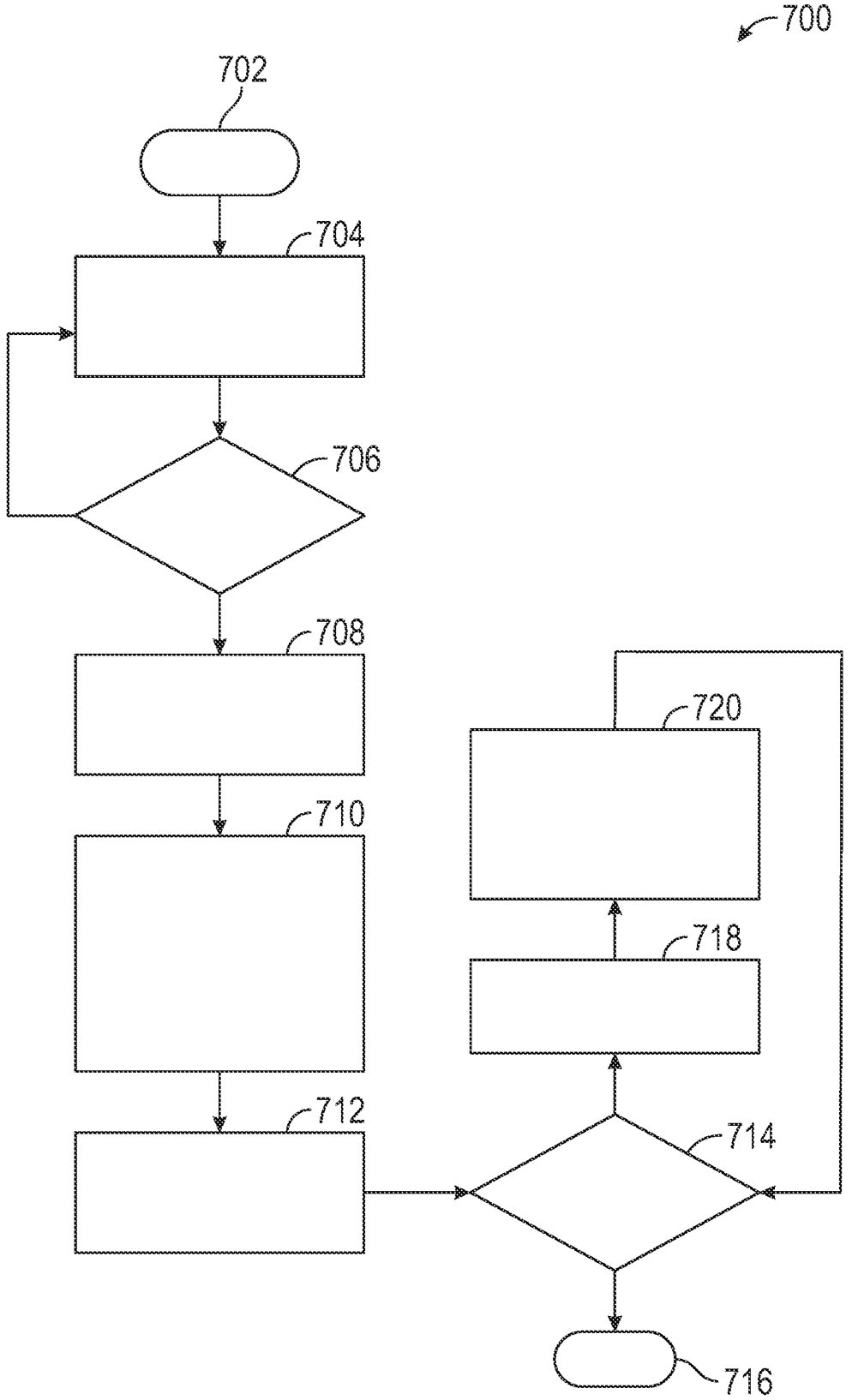
FIGS. 10-12 are flowcharts illustrating a control method performed by the manufacturing control system in accordance with various embodiments.

Referring now to FIG. 10, and with continued reference to FIGS. 1-9, a flowchart illustrates a method 700 that can be performed by manufacturing control system 600 of FIG. 9 in accordance with the present disclosure. In one example, the method 700 is performed by the processor 490 of the controller 418. As can be appreciated in light of the disclosure, the order of operation within the method 700 is not limited to the sequential execution as illustrated in FIG. 10, but may be performed in one or more varying orders as applicable and in accordance with the present disclosure. In various embodiments, the method 700 can be scheduled to run based on one or more predetermined events, and/or can run continuously during operation of the manufacturing system 400.

The method begins at 702. At 704, the method 700 receives and processes the sensor data 616. For example, the method 700 receives and processes the image data from the optical cameras 416*a*, 416*b*. At 706, the method 700 determines whether the laser welders 460 of the first welding subsystem 414*a* and the second welding subsystem 414*b* are at the initial, start position. If true, the method 700 proceeds to 708. Otherwise, the method 700 loops to 704.

Figure 11:
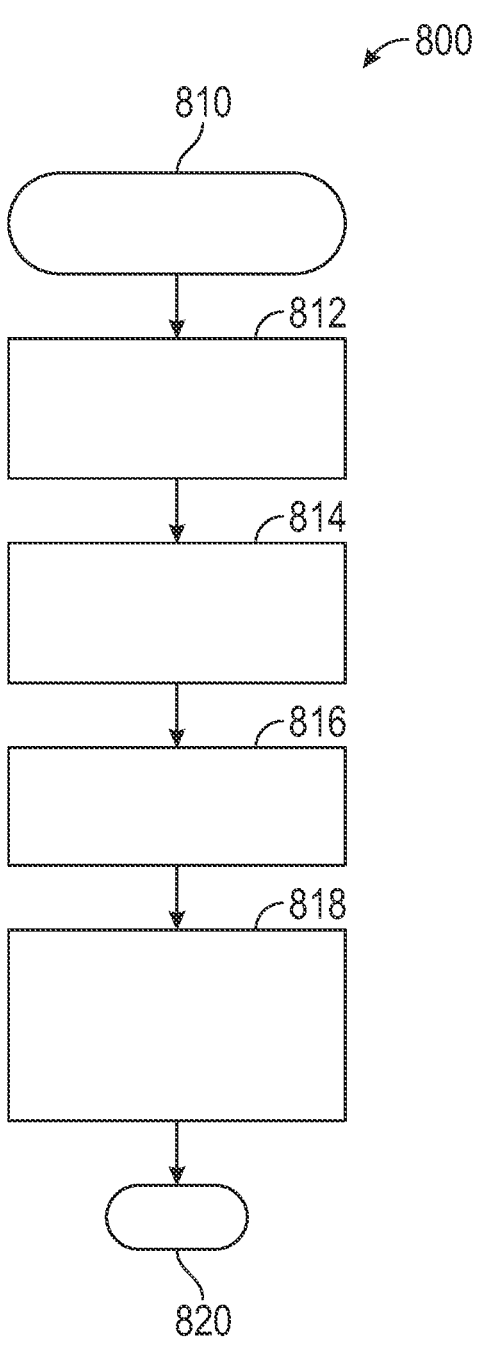

At 708, the method 700 determines the baseline speed for the actuators 474 to move the laser welders 460 of the first welding subsystem 414*a* and the second welding subsystem 414*b* using a method 800 discussed with regard to FIG. 11. At 710, the method 700 outputs one or more control signals to the actuators 474 to move the laser welders 460 at the baseline speed. At 712, the method 700 receives and processes the image data from the optical cameras 416*a*, 416*b*. At 714, the method 700 determines whether the laser welders 460 of the first welding subsystem 414*a* and the second welding subsystem 414*b* have reached the maximum position. If true, the method 700 ends at 716.

Otherwise, at 718, the method 700 determines, based on the sensor data 616, the position of the peak 112, 212, 312 and the valley 114, 214, 314. At 720, the method 700 adjusts the speed for the actuators 474 to move the laser welders 460 of the first welding subsystem 414*a* and/or the second welding subsystem 414*b* based on the position of the peak 112, 212, 312 and the valley 114, 214, 314, respectively, using a method 900 discussed with regard to FIG. 12. The method 700 loops to 714.

With reference to FIG. 11 and continued reference to FIGS. 1-9, a flowchart illustrates the method 800 that can be performed by manufacturing control system 600 of FIG. 9 in accordance with the present disclosure. In one example, the method 800 is performed by the processor 490 of the controller 418. As can be appreciated in light of the disclosure, the order of operation within the method 800 is not limited to the sequential execution as illustrated in FIG. 11, but may be performed in one or more varying orders as applicable and in accordance with the present disclosure.

In one example, the method 800 begins the baseline speed determination at 810. At 812, the method 800 receives and processes the laser welder data 624 and the line data 626. At 814, the method 800 determines or calculates the pitch angle θ of the laser welders 460 of the first welding subsystem 414*a* and the second welding subsystem 414*b* using equation (1). At 816, the method calculates the baseline speed for the actuators 474 to move the laser welders 460 of the first welding subsystem 414*a* and the second welding subsystem 414*b* using equation (2). At 818, the method 700 stores the calculated baseline speed as the current speed for the actuators 474 to move the laser welders 460 of the first welding subsystem 414*a* and the second welding subsystem 414*b*. The method 800 ends at 820.

Figure 12:
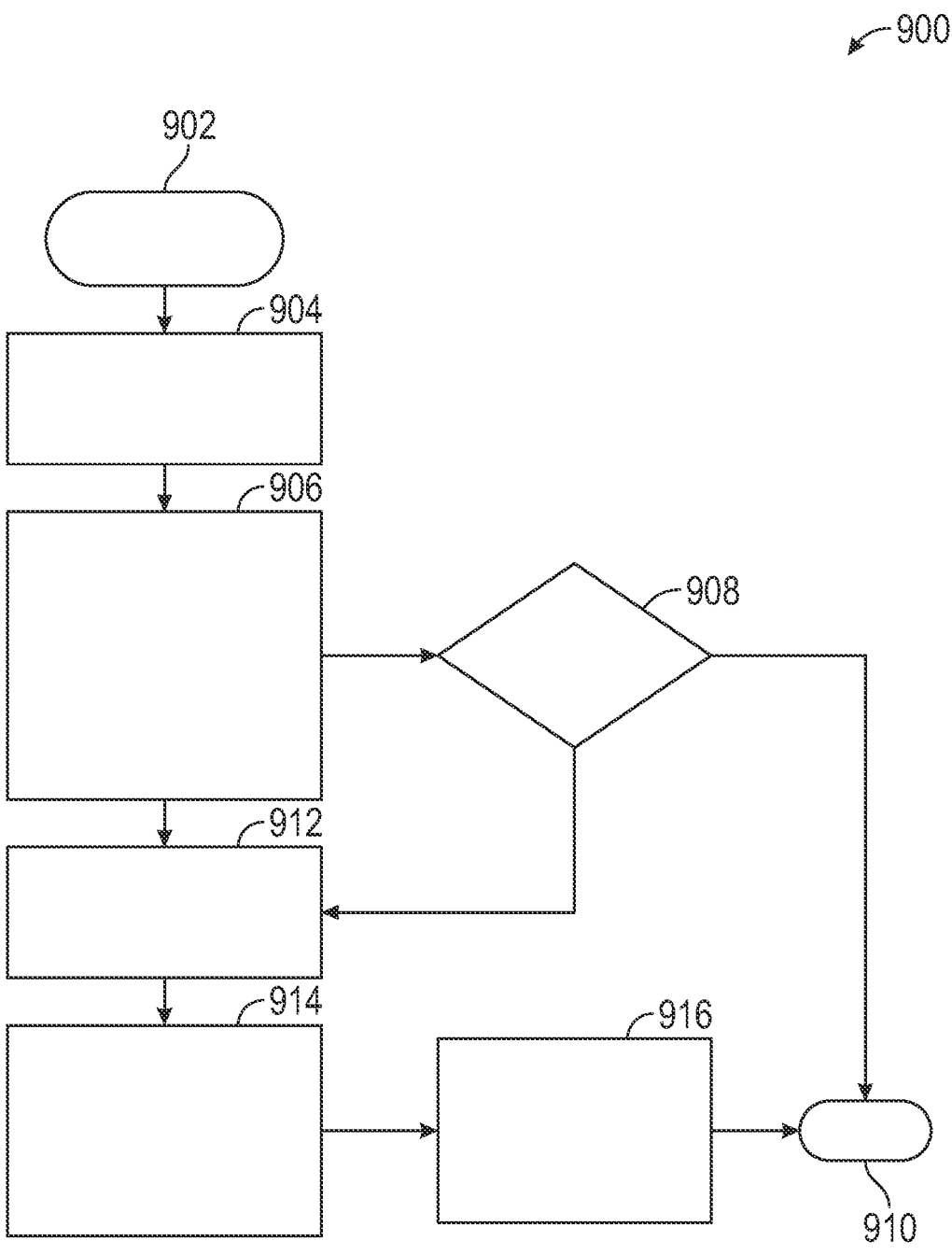

With reference to FIG. 12 and continued reference to FIGS. 1-9, a flowchart illustrates the method 900 that can be performed by manufacturing control system 600 of FIG. 9 in accordance with the present disclosure. In one example, the method 900 is performed by the processor 490 of the controller 418. As can be appreciated in light of the disclosure, the order of operation within the method 900 is not limited to the sequential execution as illustrated in FIG. 12, but may be performed in one or more varying orders as applicable and in accordance with the present disclosure.

The method 900 begins the speed adjustment for the laser welders 460 at 902. At 904, the method 900 determines the X-position of the peak 112, 212, 312 and the valley 114, 214, 314 from the sensor data 616. At 906, the method 900 subtracts the x-position of the peak 112, 212, 312 from the x-position of the laser welders 460 of the first welding subsystem 414*a* to determine the error value of the first welding subsystem 414*a* and subtracts the x-position of the valley 114, 214, 314 from the x-position of the laser welders 460 of the second welding subsystem 414*b* to determine the error value of the second welding subsystem 414*b*. At 908, the method determines whether the error value is equal to zero for the respective welding subsystems 414*a*, 414*b*. If true, the method 900 ends at 910.

Otherwise, the method 900, at 912, applies the PID algorithm of equation (3) to determine or calculate the correction term for the welding subsystem 414*a*, 414*b* for which the error value was not equal to zero. At 914, the method 900 retrieves the current speed for the respective actuator 474 to move the laser welders 460 and adds the correction term to the current speed to calculate a new speed for the actuator 474 to move the respective laser welders 460. At 916, the method 900 stores the new speed for the actuator 474 to move the respective laser welders 460 as the current speed. The method 900 ends at 910.

Thus, the structural panel assembly 100, 200, 300 provides support for occupants, while also providing protection for one or more batteries associated with the vehicle 10. In this regard, the intermediate panel 106, 206, 306 comprises or acts as a truss structure, in both a longitudinal direction (along the longitudinal axis L) and in a transverse direction or direction substantially perpendicular to the longitudinal axis L. In addition, the structural panel assembly 200 provides reduced weight, while still providing support and protection. The structural panel assembly 300 enables the structural panel assembly 300 to be used with vehicles that have a larger width due to the longitudinal arrangement of the peaks 312 and the valleys 314. The manufacturing system 400 enables the efficient formation of the structural panel assembly 100, 200, 300. In addition, by employing the optical cameras 416*a*, 416*b*, the movement of the laser welders 460 is synchronized to the position of the peaks 112, 212, 312 and the valleys 114, 214, 314 to ensure the material 402*a*, 404*a*, 406*a* is properly welded together. In addition, as the manufacturing system 400 produces the structural panel assembly 100, 200, 300 in a continuous process (rather than a batch process), the manufacturing system 400 is more efficient. Further, the voids existing between the peaks 112, 212, 312 and the valleys 114, 214, 314 may be filled easily with a material, including, but not limited to expanding foam, etc., to enhance sound clamping, strength and/or to provide thermal isolation. Additionally, the ability to maintain a constant force using the first thickness setting system 412*a* and the second thickness setting system 412*b* to close gaps between the material 402*a*, 404*a*, 406*a* during the laser welding by the laser welders 460 increases the robustness of the manufacture of the structural panel assembly 100, 200, 300.

It should be noted that while the laser welders 460 were described herein as being employed to weld the structural panel assembly 100, 200, 300 together, in other embodiments, resistance spot welding may be used to weld two of the top panel 102 and the intermediate panel 106, 206, 306 or the bottom panel 104 and the intermediate panel 106, 206, 306, and laser welders 460 may be used to weld the other of the top panel 102 or the bottom panel 104 to the intermediate panel 106, 206, 306. In addition, while the manufacture of the structural panel assembly 300 is described herein as employing the sensor system 416 to synchronize the laser welders 460, in other embodiments, the structural panel assembly 300 may be manufactured without the sensor system 416, if desired.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
   a frame that defines an opening; and
   a structural panel assembly coupled to the opening, the structural panel assembly including:
   a first material;
   a second material opposite the first material; and
   a third material positioned between the first material and the second material, the third material having an undulating shape that includes a peak and a valley, and the first material is coupled to the peak and the second material is coupled to the valley, wherein the third material includes a plurality of openings extending through the third material.

2. The vehicle of claim 1, wherein the first material, the second material and the third material are composed of a metal or a metal alloy.

3. The vehicle of claim 2, wherein the first material is welded to the peak and the second material is welded to the valley.

4. The vehicle of claim 3, wherein the first material is welded to the peak via a plurality of intermittent welds, and the second material is welded to the valley via a second plurality of intermittent welds.

5. The vehicle of claim 1, wherein the structural panel assembly has a longitudinal axis and the peak and the valley each extend along an axis parallel to the longitudinal axis.

6. The vehicle of claim 1, wherein the structural panel assembly has a longitudinal axis and the peak and the valley each extend along an axis perpendicular to the longitudinal axis.

7. The vehicle of claim 1, wherein the third material includes a wall interconnecting the peak and the valley, the wall including the plurality of openings, and wherein the plurality of openings define a plurality of legs interconnecting the peak with the valley.

8. The vehicle of claim 7, wherein each of the plurality of openings extends through the wall from a first surface of the wall to an opposite second surface of the wall.

9. The vehicle of claim 1, wherein the opening separates an occupant cabin from a stowage compartment for one or more batteries associated with the vehicle.

10. A vehicle, comprising:

a frame that defines an opening that separates an occupant cabin from a stowage compartment;

a structural panel assembly coupled to the opening to enclose the opening, the structural panel assembly including:

a first material;

a second material opposite the first material; and a third material positioned between the first material and the second material, the third material having an undulating shape that includes a peak and a valley, the first material, the second material and the third material composed of a metal or metal alloy, and the first material is welded to the peak and the second material is welded to the valley, wherein the third material includes a plurality of openings extending through the third material.

11. The vehicle of claim 10, wherein the first material is welded to the peak via a plurality of intermittent welds, and the second material is welded to the valley via a second plurality of intermittent welds.

12. The vehicle of claim 10, wherein the structural panel assembly has a longitudinal axis and the peak and the valley each extend along an axis parallel to the longitudinal axis.

13. The vehicle of claim 10, wherein the structural panel assembly has a longitudinal axis and the peak and the valley each extend along an axis perpendicular to the longitudinal axis.

14. The vehicle of claim 10, wherein the third material includes a wall interconnecting the peak and the valley, the wall including the plurality of openings, and wherein the plurality of openings define a plurality of legs interconnecting the peak with the valley.

15. The vehicle of claim 14, wherein each of the plurality of openings extends through the wall from a first surface of the wall to an opposite second surface of the wall.

16. The vehicle of claim 7, wherein the plurality of openings comprise triangular openings.

17. The vehicle of claim 16, wherein the triangular openings are isosceles triangles arranged such that an apex of a first one of the triangular openings is adjacent to a base of an adjacent second one of the triangular openings.

18. The vehicle of claim 8, wherein the plurality of openings comprise alternating triangular openings.

19. The vehicle of claim 18, wherein each of the plurality of legs extends at an angle of about 45 degrees relative to the valley.

20. The vehicle of claim 15, wherein the plurality of openings comprise alternating isosceles triangles arranged such that an apex of a first one of the openings is adjacent to a base of an adjacent second one of the openings, and wherein the plurality of legs extend at an angle of about 45 degrees relative to the valley.

* * * * *